(12) United States Patent  (10) Patent No.: US 7,702,025 B2
Sudo  (45) Date of Patent: Apr. 20, 2010

(54) TRANSMISSION/RECEPTION APPARATUS AND TRANSMISSION/RECEPTION METHOD

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 1572 days.

(21) Appl. No.: 10/487,574

(22) PCT Filed: Aug. 7, 2002

(86) PCT No.: PCT/JP02/08046

§ 371 (c)(1), (2), (4) Date: Feb. 25, 2004

(87) PCT Pub. No.: WO03/021856

PCT Pub. Date: Mar. 13, 2003

(65) Prior Publication Data

US 2004/0237016 A1  Nov. 25, 2004

(30) Foreign Application Priority Data

Aug. 31, 2001 (JP) ............................. 2001-265080
Apr. 16, 2002 (JP) ............................. 2002-113607

(51) Int. Cl.
*H04L 5/12* (2006.01)

(52) U.S. Cl. .................. 375/261; 375/260; 375/267; 375/298; 375/329; 714/746; 714/765

(58) Field of Classification Search ......... 375/260–262, 375/285, 340–342, 211, 214, 219, 220, 269, 375/279, 298, 303, 308, 329, 265, 347; 714/746–750, 714/763–765

See application file for complete search history.

(56) References Cited

U.S. PATENT DOCUMENTS 5,563,895 A * 10/1996 Malkamaki et al. ......... 714/748
5,719,883 A *  2/1998 Ayanoglu .................... 714/751
6,101,168 A *  8/2000 Chen et al. .................. 370/228
6,138,260 A * 10/2000 Ketseoglou ................. 714/751

(Continued)

FOREIGN PATENT DOCUMENTS

CN  1513240  7/2004

(Continued)

OTHER PUBLICATIONS

U.S. Appl. No. 60/296,099, filed Jun. 2001, Zhu et al.

(Continued)

*Primary Examiner*—David C Payne
*Assistant Examiner*—Rahel Guarino
(74) *Attorney, Agent, or Firm*—Dickinson Wright PLLC

(57) ABSTRACT

In the case of transmitting a signal of at least three bits in one symbol, when receiving a retransmission request signal from a radio station of a communication partner, a transmission apparatus 10A retransmits only the bits (lower bits) that are susceptible to error, without retransmitting the bits (higher bits) that are not readily susceptible to error and that are obtained by processing in a modulation section 11. A reception apparatus 10B of the communication partner performs error correction processing using the bits (higher bits) and that are stored in memories 16 and 17 and that are not readily susceptible to error, and the bits that are obtained by retransmission and that are susceptible to error (lower bits).

17 Claims, 23 Drawing Sheets

U.S. PATENT DOCUMENTS

| | | | |
|---|---|---|---|
| 6,438,367 B1 * | 8/2002 | Crawford | 455/410 |
| 6,594,283 B1 * | 7/2003 | Horspool et al. | 370/501 |
| 6,810,488 B2 * | 10/2004 | Teng | 714/4 |
| 7,072,307 B2 * | 7/2006 | Tong et al. | 370/253 |
| 7,093,178 B2 * | 8/2006 | Kim et al. | 714/748 |
| 7,120,134 B2 * | 10/2006 | Tiedemann et al. | 370/329 |
| 2002/0154610 A1 * | 10/2002 | Tiedemann et al. | 370/329 |
| 2002/0163975 A1 * | 11/2002 | Uesugi et al. | 375/295 |
| 2003/0039229 A1 * | 2/2003 | Ostman | 370/335 |
| 2003/0040284 A1 | 2/2003 | Sato | |
| 2003/0165120 A1 | 9/2003 | Uesugi et al. | |

FOREIGN PATENT DOCUMENTS

| | | |
|---|---|---|
| EP | 0948154 | 10/1999 |
| EP | 1011245 | 6/2000 |
| EP | 1043858 | 10/2000 |
| EP | 1043858 A1 * | 10/2000 |
| EP | 1083720 | 3/2001 |
| EP | 1253759 | 10/2002 |
| EP | 1 301 002 | 4/2003 |
| JP | 888620 | 4/1996 |
| JP | 11266256 | 9/1999 |
| JP | 2000 4196 | 1/2000 |
| JP | 2000 31944 | 1/2000 |
| JP | 2000 188582 | 7/2000 |
| JP | 2000 201132 | 7/2000 |
| JP | 2000 244461 | 9/2000 |
| JP | 2001 77789 | 3/2001 |
| JP | 2001 119426 | 4/2001 |
| JP | 2001 203767 | 7/2001 |
| JP | 2001 523918 | 11/2001 |
| JP | 2002 84213 | 3/2002 |
| JP | 2002 510898 | 4/2002 |
| JP | 2002 171245 | 6/2002 |
| JP | 2002 171298 | 6/2002 |
| JP | 2002 199037 | 7/2002 |
| JP | 2002 281003 | 9/2002 |
| WO | 9926371 | 5/1999 |
| WO | 9950981 | 10/1999 |
| WO | 0040852 | 8/2000 |
| WO | 02100031 | 12/2002 |

OTHER PUBLICATIONS

European Search Report dated Nov. 18, 2009.

3GPP TSG RAN R5 Ad-hoc, "Bit separation for MCS selection and multipath interference cancellation for HSDPA," 3GPP DRAFT, TSGR1-01-0713, 3rd Generation Partnership Project (3GPP), XP050095051, Aug. 2001, pp. 1-17.

R. Otnes et al., "Adaptive Data Rate Using ARQ and Nonuniform Constellations," VTC 2001 Spring, IEEE VTS $53^{rd}$ Vehicular Technology Conference, XP001067154, May 2001, pp. 1211-1215.

C. Law et al., "A modified adaptive hybrid FEC/ARQ protocol using turbo codes with incremental redundancy transmission," VTC 1999, IEEE VTS $50^{th}$ Vehicular Technology Conference, XP010353328, Sep. 1999, vol. 3, pp. 1670-1674.

T. Kumagai et al., "A maximal ratio combining frequency diversity ARQ scheme for OFDM signals," Personal, Indoor and Mobile Radio Communications, 1998. The Ninth IEEE International Symposium on Boston, MA, XP010314535, Sep. 1998, pp. 528-532.

* cited by examiner

——— THRESHOLD VALUES OF 1ST AND 2ND BITS
- - - - - THRESHOLD VALUES OF 3RD AND 4TH BITS

——— THRESHOLD VALUES OF 1ST AND 2 ND BITS
----------- THRESHOLD VALUES OF 3RD AND 4TH BITS
—-—-—-— THRESHOLD VALUES OF 5TH AND 6TH BITS

TRANSMISSION/RECEPTION APPARATUS AND TRANSMISSION/RECEPTION METHOD

TECHNICAL FIELD

The present invention relates to a transmission/reception apparatus and transmission/reception method that are used in a digital radio communication system.

BACKGROUND ART

Conventionally, in the digital radio communication system, there is used an ARQ (Automatic Repeat reQuest) scheme that retransmits data, which cannot be demodulated due to a propagation path error. The transmission/reception apparatus of this type detects a transmission error of a received signal and sends a retransmission request signal to a radio station of a communication partner when detecting the error. The radio station of the communication partner that received the retransmission request retransmits data corresponding to the retransmission request. Then, this processing is repeated until no error is found in the received signal. A series of these processing is called ARQ.

The configuration of this conventional kind of transmission/reception apparatus will be illustrated in FIG. 1. A transmission/reception apparatus 1 comprises a modulation transmission section 2, a reception demodulation section 3 and a retransmission control section 4 in broad outline. Upon transmission, the transmission/reception apparatus 1 transmits a transmission signal S1 to a modulation section 5 via the retransmission control section 4.

The modulation section 5 performs predetermined modulation processing to the transmission signal S1 to form a modulation signal, and transmits the modulation signal to a transmission section 6. The transmission section 6 performs predetermined radio transmission processing such as digital/analog conversion processing, up-conversion, transmission power control and the like, to the modulation signal, and transmits the processed signal to an antenna AN 1.

Meanwhile, at a receiving time, the transmission/reception apparatus 1 inputs a received signal obtained via an antenna AN 2 to a reception section 7. The reception section 7 performs predetermined radio reception processing such as signal amplification, down-conversion, analog/digital conversion processing and the like, to the received signal. An error correction section 8 performs predetermined error correction processing to the input data. The error-corrected received data is transmitted to the retransmission control section 4 and an error detection section 9. The error detection section 9 performs CRC (Cyclic Redundancy Check) to detect an error of the error-corrected received signal, and transmits a detection result to the retransmission control section 4.

When no error is detected by the error detection section 9, the retransmission control section 4 outputs the error-corrected received data input from the error correction section 8 as a received signal S2. In contrast to this, when an error is detected by the error detection section 9, the retransmission control section 4 transmits a retransmission request signal to a radio station of a communication partner at a predetermined timing.

By the way, when data having a propagation path error is retransmitted using the aforementioned ARQ scheme, substantial transmission efficiency decreases by an amount corresponding to the repetitions of retransmissions. That is, the greater the number of retransmissions, the more extra transmissions, and so communication capacity used in actual signal transmission decreases, so that transmission efficiency decreases.

Thus, the conventional transmission/reception apparatus has a problem that, when an error occurs in the received data, the radio station of communication partner is requested to retransmit the error data, so that radio resource is used by an amount corresponding to the occurrence of error, and the throughput reduces.

DISCLOSURE OF INVENTION

An object of the present invention is to provide a transmission/reception apparatus and transmission/reception method capable of suppressing substantial reduction in transmission efficiency due to retransmission of data, without increasing error rate.

The above object can be achieved by retransmitting only those bits that are susceptible to error as retransmission signal, when a retransmission request issues. Then, a radio station that transmitted the retransmission request stores bits that are not readily susceptible to error and, when the bits susceptible to error are retransmitted, the stored bits are combined with the retransmitted bits, so that desired received data may be obtained.

BEST MODE FOR CARRYING OUT THE INVENTION

According to the present invention, considering that, in modulation schemes that transmit signals of three bits or more in one symbol as in 16-level QAM and 8 PSK, generally, when error occurs in a received signal, such error concentrates on bits other than the first and second bits, bits apart from the first and second bits are subject to retransmission.

For example, in 16-level QAM, information representing polarity is superimposed on the first and second bits, and information representing amplitude is superimposed on the third and fourth bits. Here, the difference between the information of the third and fourth bits representing amplitude and the threshold level by which this information is determined is only a half of the difference between the information of the first and second bits representing polarity and a threshold level by which this information is determined. For this reason, in the 16-level QAM, the probability that the third and fourth bits will have an error is about twice as much as the probability that the first and second bits will have an error.

The following will specifically explain embodiments of the present invention with reference to the accompanying drawings.

Embodiment 1

Figure 1:
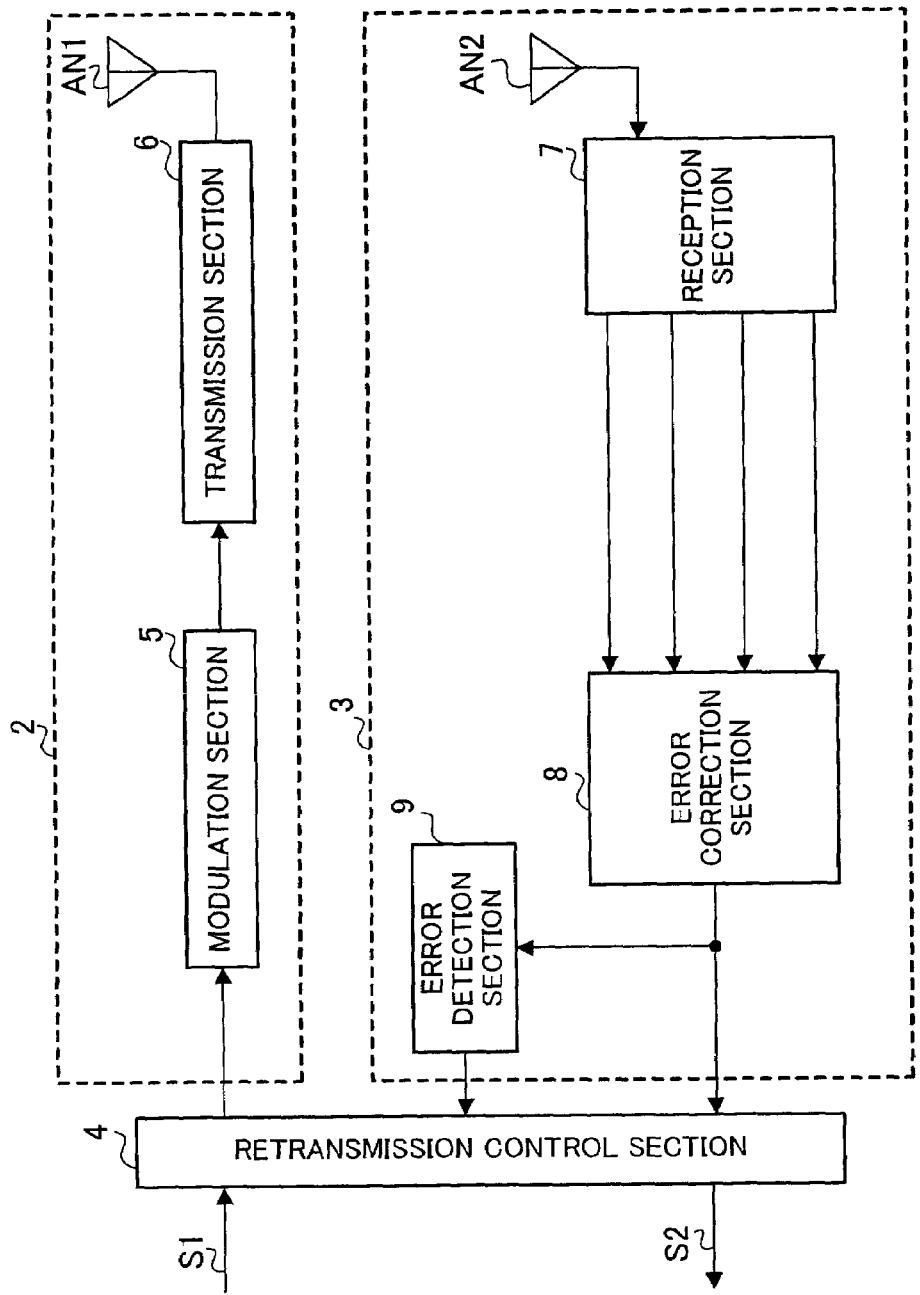
FIG. 1 is a block diagram illustrating a configuration of a conventional transmission/reception apparatus.
Figure 2:
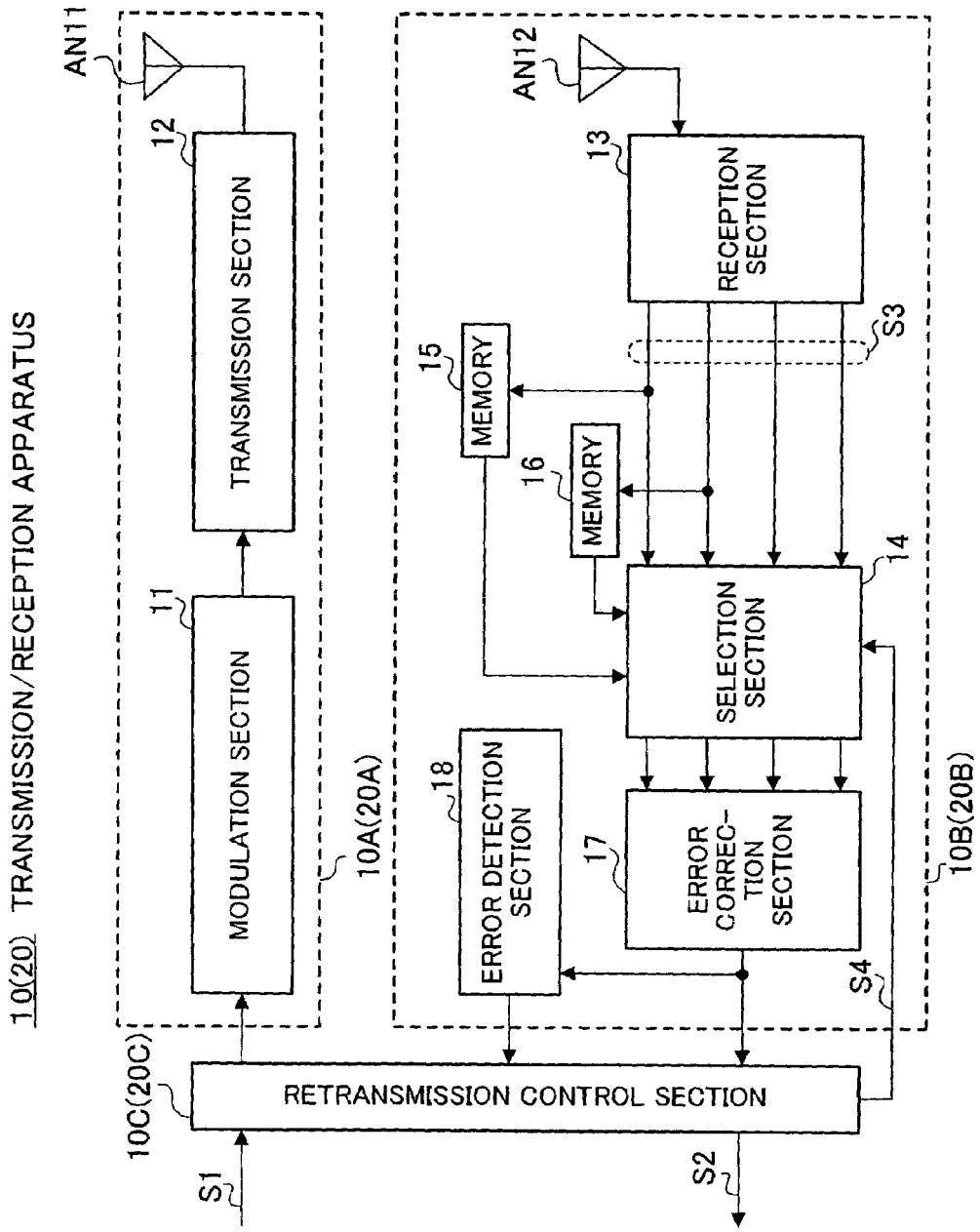
FIG. 2 is a block diagram illustrating a configuration of a transmission/reception apparatus according to Embodiment 1 of the present invention.

In FIG. 2, 10(20) as a whole shows a configuration of a transmission/reception apparatus according to Embodiment 1 of the present invention.

Figure 3:
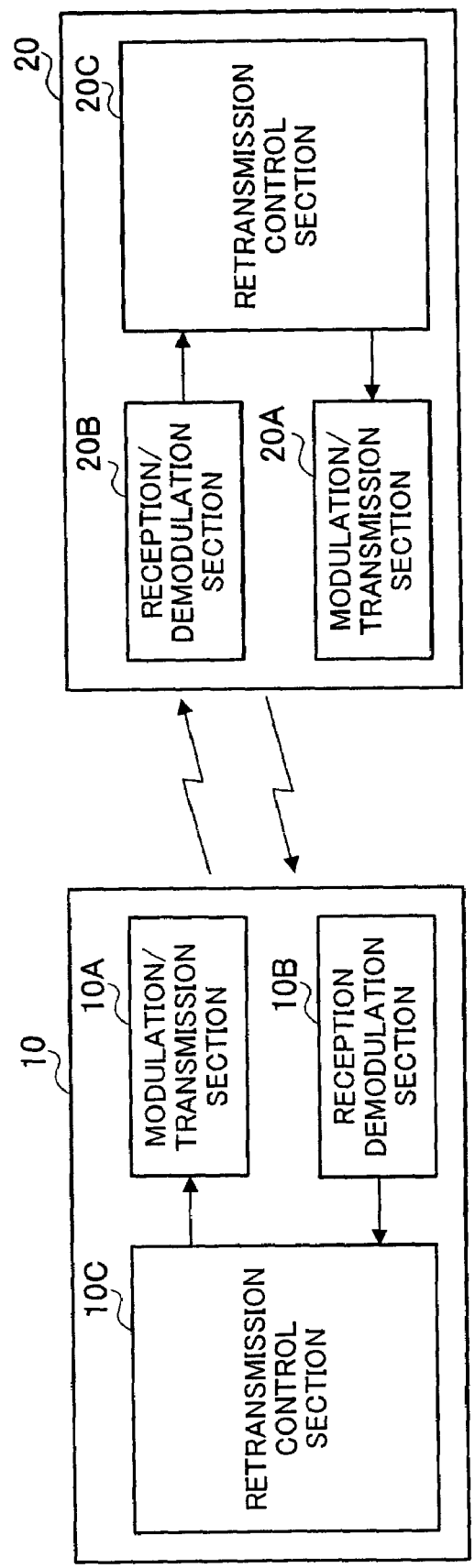
FIG. 3 is a block diagram illustrating a radio communication system using a transmission/reception apparatus of the present invention.

A transmission/reception apparatus 10 (20) is provided in, for example, a radio base station and a communication terminal. Here, both the transmission/reception apparatus 10 and the transmission/reception apparatus 20 have the same configuration, and form a radio communication system 1000 that performs two-way communication as illustrated in FIG. 3.

The radio communication system 1000 transmits a signal to the transmission/reception apparatus 20 from a modulation transmission section 10A of the transmission/reception apparatus 10. In the transmission/reception apparatus 20, this signal is received and modulated by a reception/modulation section 20B. Then, when there is an error in the received signal, a retransmission control section 20C transmits a retransmission request signal to the transmission/reception apparatus 10 via a modulation transmission section 20A.

When the transmission/reception apparatus 10 receives the retransmission request signal, a retransmission control section 10C transmits a signal subject to retransmission to the transmission/reception apparatus 20 via a modulation transmission section 10A. Thus, for the sake of explanation, this embodiment will describe a case where the transmission/reception apparatus 20 of the communication partner for the transmission/reception apparatus 10 is formed by the same configuration as that of the transmission/reception apparatus 10.

Referring back to FIG. 2, the configuration of the transmission/reception apparatus 10 will be explained. At the time of transmission, the transmission/reception apparatus 10 transmits a transmission signal S1 to a modulation section 11 via the retransmission control section 10C. The modulation section 11 performs predetermined modulation processing to the transmission signal S1 to form a modulation signal, and transmits the modulation signal to a transmission section 12. In the case of this embodiment, the modulation section 11 performs 16-level QAM modulation to modulate the transmission signal S1 of four bits into one symbol.

The transmission section 12 performs orthogonal multicarrier modulation to the modulation signal subjected to 16-level QAM modulation to form an OFDM (Orthogonal Frequency Division Multiplex) signal. In other words, the symbols of the modulation signal subjected to 16-level QAM modulation are superimposed on multiple subcarriers orthogonal to each other. The transmission section 12 also performs predetermined radio transmission processing such as digital/analog conversion processing, up-conversion, transmission power control and the like to the OFDM modulated signal, and supplies the processed signal to an antenna AN 11.

Meanwhile, at the time of reception, the transmission/reception apparatus 10 inputs a received signal obtained via an antenna AN 12 to a reception section 13. The reception section 13 performs predetermined radio reception processing such as signal amplification, down-conversion, analog/digital conversion processing and the like to the received signal. The reception section 13 also performs serial-parallel conversion and inverse Fourier transform of the received signal to provide OFDM modulation processing. Moreover, the reception section 13 demodulates a 16-level QAM signal to form four-bit demodulation data S3.

Figure 4:
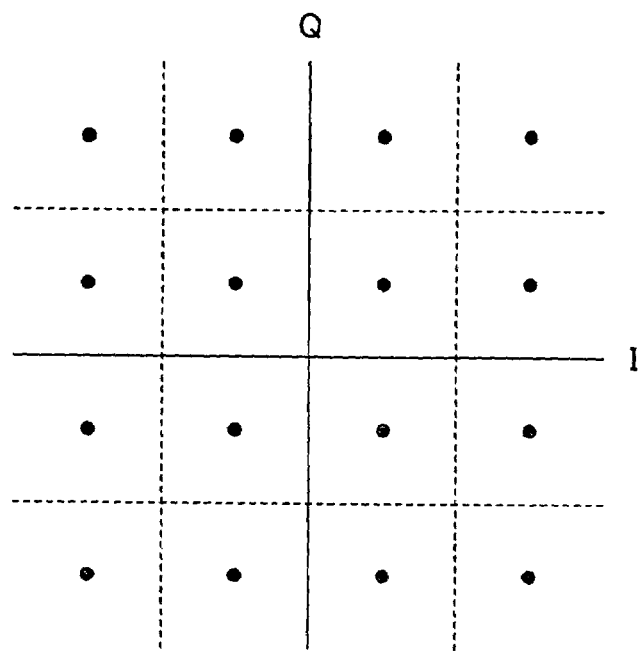
FIG. 4 is a block diagram illustrating a relationship between the arrangement of symbols of 16-level QAM signal on an I-Q plane and threshold-levels at the time of demodulation.

This four-bit demodulation data S3 is input to a selection section 14. Higher two bits of the modulation data S3 are stored in memories 15 and 16. Here, FIG. 4 shows the relationship between the positions of the respective symbols of 16-level QAM on an I-Q plane and threshold-levels used upon demodulation of a 16-level QAM signal by the reception section 13.

In 16-level QAM, four-bit (that is, 16-level) data can be expressed in one symbol depending on which position on the I-Q plane each symbol exists. The higher two bits are bits that represent polarity, and are bits that depend on whether the symbols exist in plus direction or in minus direction with respect to the I-axis and the Q-axis at the time of demodulation. In other words, as illustrated in FIG. 4, with the I-axis and Q-axis as the threshold levels, they depend on whether the target symbol exists at the I-axis side or Q-axis side.

Moreover, lower two bits are bits that represent amplitude and are bits that depend on the magnitude of symbol amplitude at the time of demodulation. Namely, with the dotted lines of FIG. 4 as the threshold level, they depend on in which side of the threshold level the target symbol exists.

As is obvious from the above, 16-level modulated symbol has a long distance from the I-axis and Q-axis as the threshold levels for the higher two bits, but has a short distance from the threshold levels for the lower two bits.

As a result, in consideration of a case where the phase of signal is shifted by some influence at a signal propagation time, as compared with the probability of exceeding the threshold levels for the higher two bits with relatively a long distance from the origin on the I-Q plane, the probability of exceeding the threshold levels for the lower two bits with relatively a short distance therefrom becomes high. Namely, it can be said that the higher two bits are bits that are not readily susceptible to transmission error and the lower two bits are bits that are susceptible to transmission error. In this embodiment, the higher two bits having little transmission error are stored in the memories 15 and 16.

Demodulation data S3 output from the reception section 13 is transmitted to the selection section 14. The selection section 14 selects demodulation data S3 from the reception section 13 and demodulation data comprising higher two bits stored in the memories 15 and 16 and arranges them based on a retransmission timing signal S4 from the retransmission control section 10C.

Actually, when the retransmission timing signal S4 represents that retransmission is not currently performed (namely, a case of showing an initial transmission), the selection section 14 selects four-bit demodulation data S3 output from the reception section 13 as it is and transmits it to a subsequent error correction section 17. In contrast to this, when the retransmission timing signal S4 represents that retransmission is currently performed, the selection section 14 selects retransmitted modulation data comprising lower two bits and data comprising higher two bits stored in the memories 15 and 16 at the time of initial transmission and arranges them, and transmits them to the subsequent error correction section 17.

The error correction section 17 performs predetermined error correction processing to input data. The error-corrected received data is transmitted to the retransmission control section 10C and an error detection section 18. The error detection section 18 performs CRC to detect an error of the error-corrected received data, and transmits the detection result to the retransmission control section 10C.

When no error is detected by the error detection section 18, the retransmission control section 10C outputs error-corrected received data input from the error correction section 17 as a received signal S2. In contrast to this, when an error is detected by the error detection section 18, the retransmission control section 10C transmits a retransmission request signal to the transmission/reception apparatus 20 of the communication partner via the modulation section 11, the transmission section 12 and the antenna AN 11.

At this time, the transmission/reception apparatus 20 of the communication partner, which receives the retransmission request signal, retransmits only the lower two bits and not the four-bit data transmitted at the first time. This makes it possible to reduce the number of retransmission bits as compared with the case in which all bits (four bits) are retransmitted again as a retransmission signal.

Here, when the transmission/reception apparatus 10 receives the retransmitted lower two bits, they are modulated by the reception section 13 and input to the selection section 14. The selection section 14 selectively outputs the higher two bits stored in the memories 15 and 16 and the retransmitted lower two bits.

Figure 5:
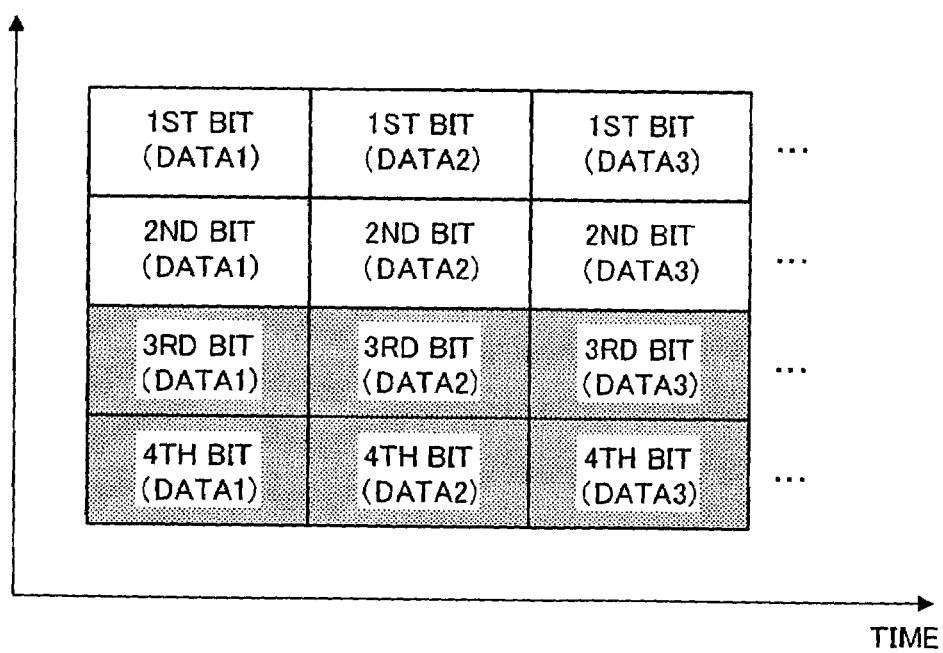
FIG. 5 is a view indicating the unlikelihood of error occurrence with the respective bits that form a 16-level QAM signal.

According to the above configuration, the transmission/reception apparatus 10 receives the 16-level-QAM-modulated transmission signal from the transmission/reception apparatus 20 via the antenna AN 12. The transmission/reception apparatus 10 demodulates the received signal by the reception section 13 to form four-bit demodulation data S3. Then, the transmission/reception apparatus 10 stores the higher two bits of demodulation data S3, not readily susceptible to error at the time of demodulation in the memories 15 and 16. In other words, the third bit and the fourth bits shown with the shade in FIG. 5 are directly transmitted to the selection section 14, while the first bit and the second bit shown with the white ground are stored in the memories 15 and 16.

Four-bit modulation data S3 is transmitted to the error correction section 17 via the selection section 14. It is detected whether the error-corrected modulation signal has an error by the error detection section 18, and when there is no error, it is output as a received signal S2 via the retransmission control section 10C. In contrast to this, when an error is detected, a retransmission request signal is transmitted to the transmission/reception apparatus 20 of the communication partner.

At this time, the transmission/reception apparatus 20 of the communication partner retransmits only the lower two bits and not all bits (four bits) as a retransmission signal. As a result, a two-bit reduction is made with the retransmission signal. In addition, the retransmitting lower two bits may be QPSK-modulated by the modulation 11 and transmitted, or the retransmitting bits may be 16 QAM-modulated two bits by two bits, total four bits, and transmitted.

Then, the transmission/reception apparatus 10 performs error correction processing and error detection processing again based on the retransmitted lower two bits and the stored higher two bits, and, when no error is detected, outputs the signal output as the received signal S2 from the retransmission control section 10C, and, when an error is detected, repeats the same retransmission operation as mentioned above.

Accordingly, in consideration of the fact that retransmission data comprising two bits can be reduced per retransmission, for example, when retransmission is performed twice, retransmission data comprising four bits can be reduced, and when retransmission is performed three times, retransmission data comprising six bits can be reduced.

Thus, according to the aforementioned configuration, the higher bits of demodulation data S3 not readily susceptible to error are stored, and, when an error is detected, bits other than the stored higher bits are retransmitted from the radio station of the transmission partner, thereby reducing the number of bits upon retransmission. As a result, the overall transmission efficiency can be improved without reducing the error rate.

Embodiment 2

Figure 6:
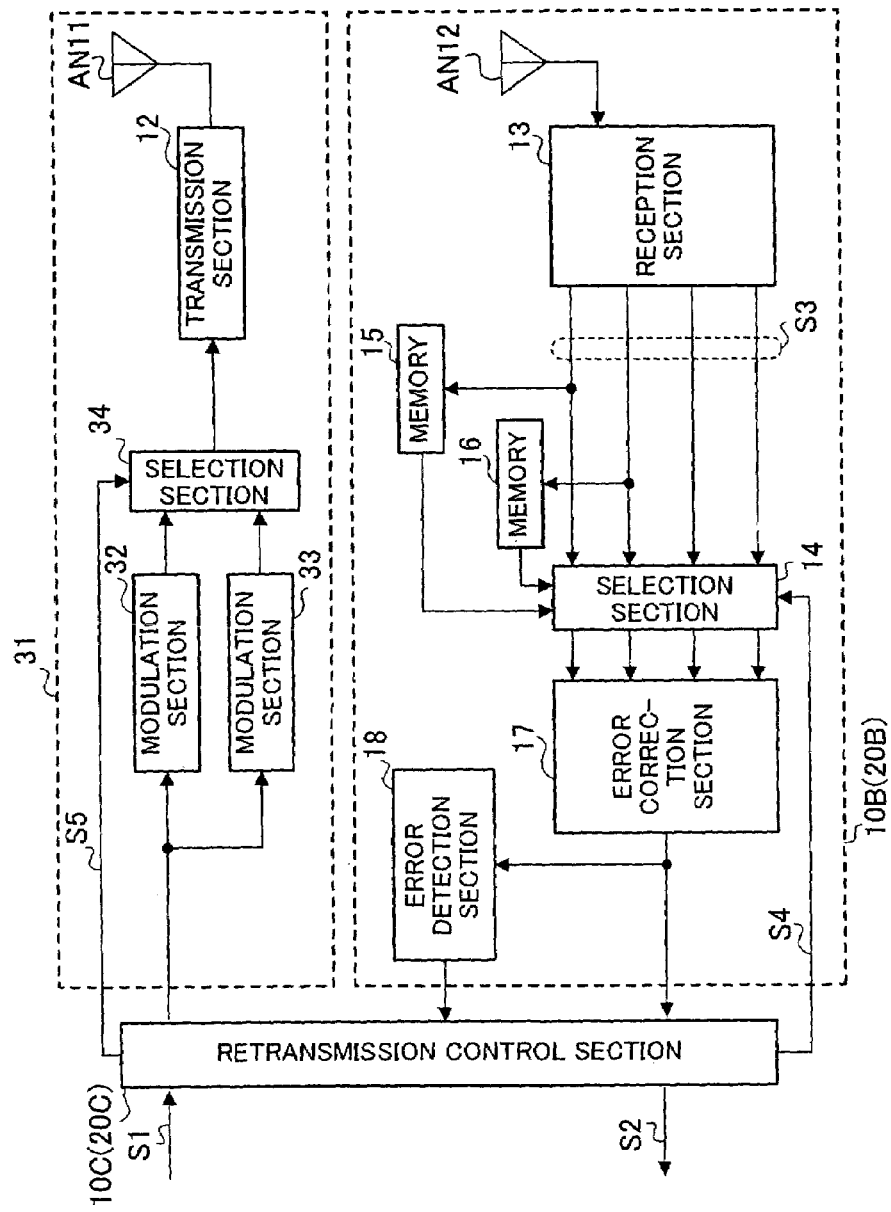
FIG. 6 is a block diagram illustrating a configuration of a transmission/reception apparatus according to Embodiment 2 of the present invention.

In FIG. 6 where the same reference numerals as those of FIG. 2 are added to the parts corresponding to FIG. 2, 30 shows as a whole a configuration of a transmission/reception apparatus according to Embodiment 2 of the present invention. The transmission/reception apparatus 30 is formed by the same configuration as that of the transmission/reception apparatus 10 of Embodiment 1 except that a modulation/transmission section 31 includes two modulation sections 32 and 33 having different modulation levels and a selection section 34 that selects and outputs one of modulation signals formed by two modulation sections 32 and 33. Moreover, similar to Embodiment 1, this embodiment also describes a case where the transmission/reception apparatus of the communication partner is formed by the same configuration as that of the transmission/reception apparatus 30.

The second modulation section 33 performs 16-level QAM modulation to a transmission signal to modulate four bits of the transmission signal S1 into one symbol, and transmits the modulation signal to the selection section 34. The first modulation section 32 performs QPSK modulation to transmission signal S1 to modulate two bits of the transmission signal S1 to one symbol and transmits the modulation signal to the selection section 34.

The selection section 34 is selection-controlled by a selection control signal S5 from the retransmission control section 10C, and, when sending a normal transmission signal, selects and outputs the 16-level QAM signal obtained from the second modulation section 34. In contrast to this, when a retransmission request is sent from the transmission/reception apparatus of the communication partner, the QPSK modulation signal obtained from the first modulation section 32 is selected and output.

In the aforementioned configuration, the transmission/reception apparatus of the communication partner for the transmission/reception apparatus 30 (since this has the same configuration as the transmission/reception apparatus 30 and FIG. 6 is used in common for explanation) performs 16-level QAM modulation processing to the transmission signal S1 using the second modulation section 33 to modulate and transmits four bits of the transmission signal S1 into one symbol.

The transmission/reception apparatus 30 stores the higher two bits of demodulated four-bit demodulation data S3 not readily susceptible to error in the memories 15 and 16. The transmission/reception apparatus 30 performs error correction and error detection to four-bit demodulation data S3 and outputs the four bits as a received signal S2 when no error is detected.

In contrast to this, when an error is detected, the transmission/reception apparatus 30 transmits a retransmission request signal to the transmission/reception apparatus of the communication partner (hereinafter referred to as second transmission/reception apparatus). When receiving the retransmission request signal, the second transmission/reception apparatus transmits a retransmission signal to the transmission/reception apparatus 30. At this time, the second transmission/reception apparatus QPSK-modulates the lower two bits of the four bits transmitted at the first time using the first modulation section 32, and transmits them to the transmission/reception apparatus 30.

The transmission/reception apparatus 30 receives the QPSK-modulated lower two bits and demodulates them. The demodulation data comprising two bits is sent to the selection section 14. The selection section 14 arranges the higher two bits stored in the memories 15 and 16 and the retransmitted lower two bits, and transmits them to the error correction section 17. An error-corrected signal is sent to the retransmission control section 10C and the error detection section 18.

Then, when no error is detected, the signal is output from the retransmission control section 10C as the received signal S2. In contrast to this, when an error is detected, the same retransmission processing as mentioned above is repeated.

In this way, according to this embodiment, 16-level QAM-modulated transmission signal is transmitted at the time of initial transmission, while the QPSK-modulated transmission signal not readily susceptible to error as compared with 16-level QAM modulation is transmitted at the time of transmitting the retransmission signal. Here, the reason QPSK modulation processing can be performed to the retransmission signal is that the higher two bits are stored and the bits to be transmitted at the time of retransmission may be the lower two bits.

This enables to reduce the probability that the lower two bits to be transmitted as the retransmission signal will cause an error. This results in a reduction of the probability that two bits stored in the memories 15 and 16 and two bits sent by retransmission will cause an error after a second transmission (namely, transmission of the lower two bits). In other words, the probability decreases that an error will be detected again by the error detection section 18 after the first retransmission. As a result, retransmissions above the second time are reduced.

Thus, according to the aforementioned embodiment, the higher bits of demodulation data S3 not readily susceptible to error are stored, and, when an error is detected, only those bits apart from the stored higher bits are retransmitted from the radio station of the transmission partner, and the transmission signal is modulated by a modulation scheme with a smaller modulation level than for the general signal, thereby reducing the number of bits relating to retransmission and reducing the number of retransmissions. As a result, substantial transmission efficiency can be further improved.

Embodiment 3

Figure 7:
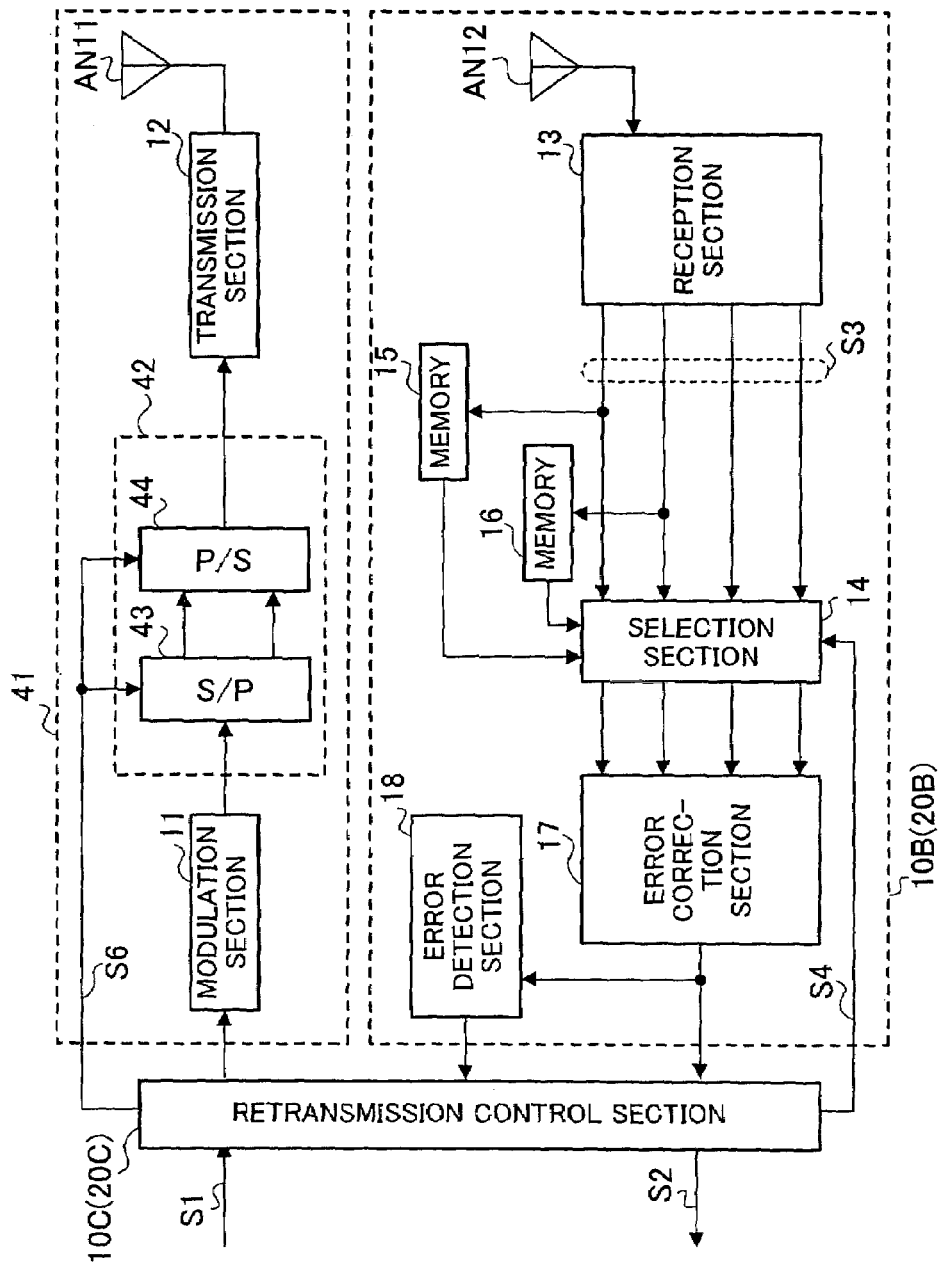
FIG. 7 is a block diagram illustrating a configuration of a transmission/reception apparatus according to Embodiment 3 of the present invention.

In FIG. 7 where the same reference numerals as those of FIG. 2 are added to the parts corresponding to FIG. 2, 40 as a whole shows a configuration of a transmission/reception apparatus according to Embodiment 3 of the present invention. The transmission/reception apparatus 40 is formed by the same configuration as that of the transmission/reception apparatus 10 of Embodiment 1 except that a symbol rearranging section 42 is provided that rearranges symbols of the modulation signal formed by the modulation section 11.

The symbol rearranging section 42 includes a serial/parallel converting circuit (S/P) 43, which serial/parallel converts the symbols of the 16-level QAM signal formed by the modulation section 11, and a parallel/serial converting circuit (P/S) 44, which parallel/serial converts the parallel signal.

When a rearrangement control signal S6, which instructs that the symbols be rearranged, is input, the serial/parallel converting circuit 43 and parallel/serial converting circuit 44 perform conversion processing different from each other, so that the symbol rearranging section 42 rearranges the order of the symbols output from the modulation section 11 based on the rearrangement control signal S6 from the retransmission control section 10C and transmits the result to the transmission section 12.

In contrast to this, when a rearrangement control signal S6, which instructs that the symbols not be rearranged, is input, the serial/parallel converting circuit 43 and parallel/serial converting circuit 44 perform conversion processing corresponding to each other, so that the symbol rearranging section 42 transmits the arrangement of the symbols output from the modulation section 11 to the transmission section 12 as it is.

Actually, the retransmission control section 10C transmits the rearrangement control signal S6, which instructs the symbol rearranging section 42 not to rearrange the symbols, at the time of normal transmission, and transmits the rearrangement control signal S6, which instructs the symbol rearranging section 42 to rearrange the symbols, at the time of retransmission.

Accordingly, in the case of a retransmission request, the retransmission signal is superimposed on a different subcarrier than the general transmission signal and transmitted upon reception of orthogonal multicarrier modulation of the transmission section 12 in which rearranged symbols continue. As a result, since the subcarriers having signals superimposed thereupon differ between transmission of the general signal and transmission of the retransmission signal, the way of receiving a frequency-selective fading differs.

Accordingly, there is a case where no error occurs at the general transmission with the frequency of subcarrier on which the retransmission signal is superimposed, even if an error occurs with the frequency of the superimposed subcarrier. In other words, as compared with the case in which the retransmission signal is transmitted many times using subcarriers of the same frequency, the way of transmitting the retransmission signal using subcarriers of different frequencies reduces the probability of transmission error.

For example, if the channel fluctuation speed is low, there may be cases where the same signal again results in error upon retransmission. In consideration of this, according to this embodiment, a different subcarrier arrangement than the general transmission is provided at the time of retransmission, thereby changing the propagation environment of each subcarrier in a pseudo manner, and preventing the same signal from causing an error continuously. In this way, the transmission/reception apparatus 40 can prevent the same signal from causing an error continuously even if the speed of change in the propagation environment is low.

Thus, according to the aforementioned configuration, even if an error occurs at the time of general transmission, the probability that the error will occur continuously at the time of retransmission can be reduced. As a result, the number of retransmissions can be decreased, and the total number of retransmission bits can be reduced.

Embodiment 4

This embodiment will explain a case where the transmitting side, using an M-ary modulation scheme that modulates data comprising six bits or more into one symbol, modulates data comprising six bits or more into one symbol and transmits it at the time of general transmission, and retransmits only the lower two bits susceptible to error when a retransmission request signal is received.

Moreover, the receiving side receives the signal by which data comprising six bits or more are transmitted in one symbol and stores higher four bits of modulated data.

Figure 8:
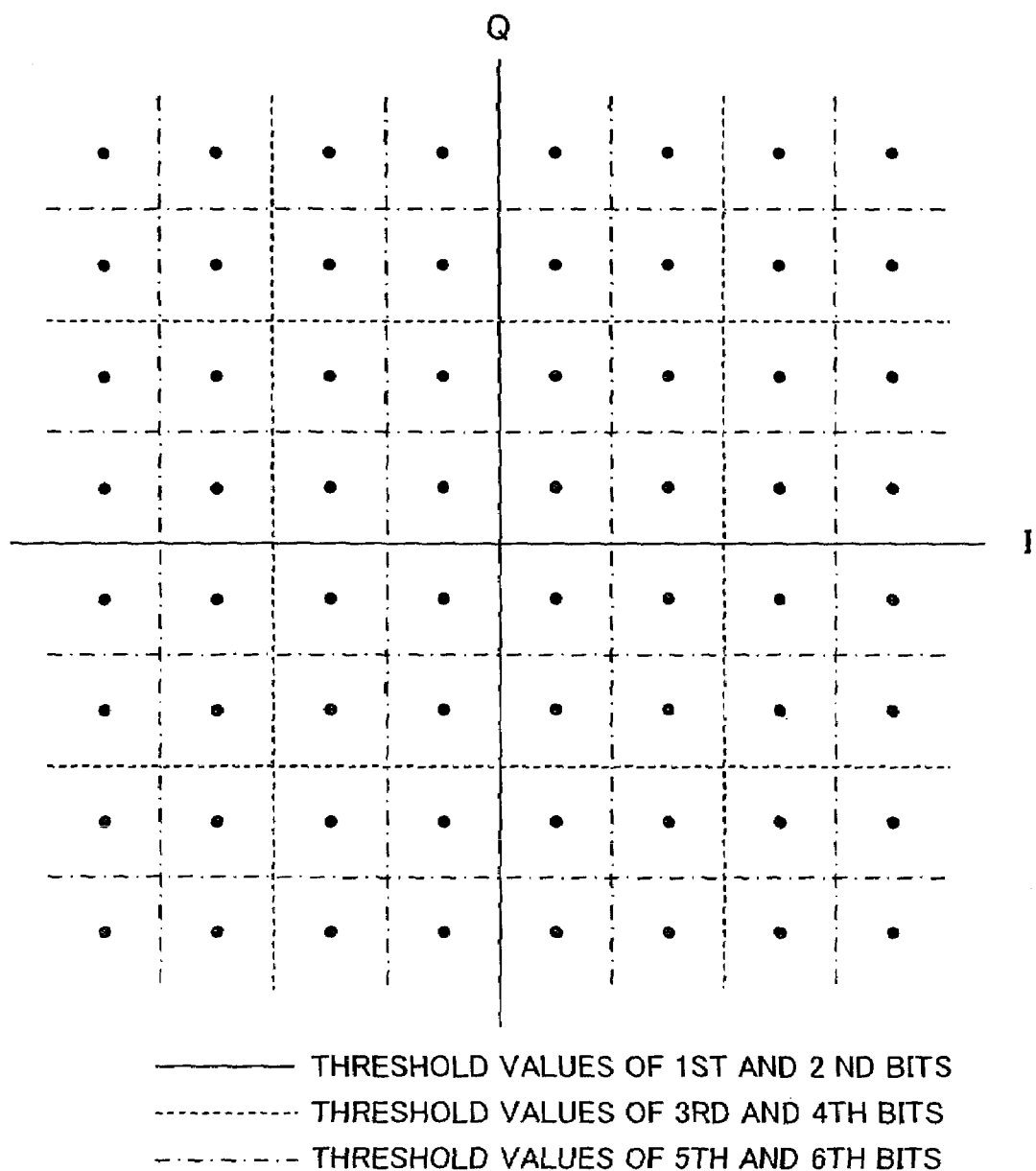
FIG. 8 is a block diagram illustrating a relationship between the arrangement of symbols of 64-level QAM signal on an I-Q plane and threshold levels at the time of demodulation.

Here, in the 64-level QAM modulation scheme, as illustrated in FIG. 8, since the difference between information representing amplitude at the fifth and sixth bits and the threshold level by which this information is determined (dot and dash lines of FIG. 8) is only a half of the difference between information representing polarity at the third and fourth bits and the threshold level by which this information is determined (dot lines of FIG. 9), error concentrates on the fifth and sixth bits. In consideration of this, according to this embodiment, in the case of using the M-ary modulation scheme that modulates data comprising six bits or more into one symbol, only the least significant two bits are retransmitted when an error occurs in the received signal. This makes it possible to reduce the number of retransmission bits effectively without increasing the error rate.

Figure 9:
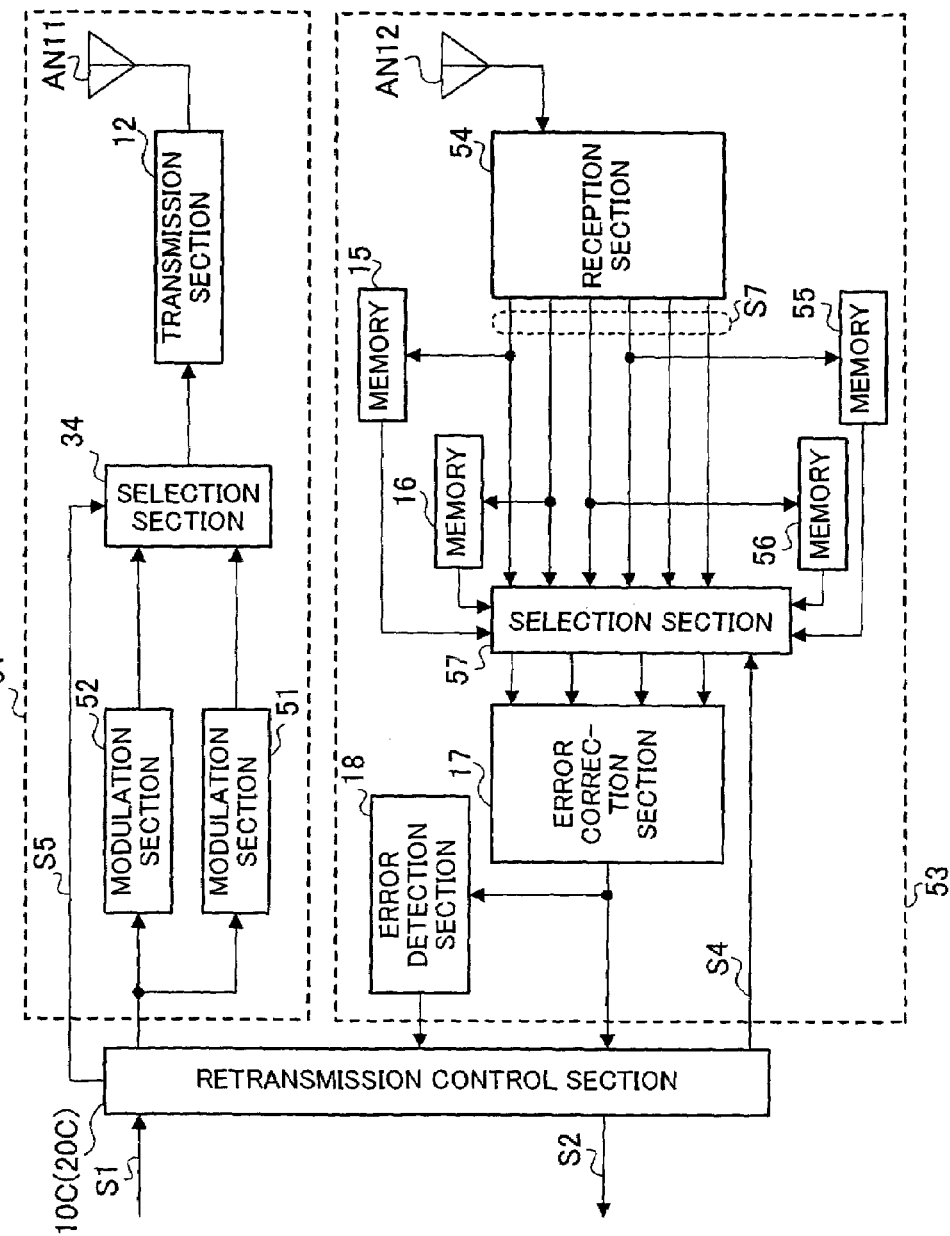
FIG. 9 is a block diagram illustrating a configuration of a transmission/reception apparatus according to Embodiment 4 of the present invention.

In FIG. 9 where the same reference numerals as those of FIG. 6 are added to the parts corresponding to FIG. 6, 50 as a whole shows a configuration of a transmission/reception apparatus according to Embodiment 4 of the present invention. A second modulation section 52 of the transmission/reception apparatus 50 performs 64-level QAM modulation to a transmission signal to modulate six bits of the transmission signal S1 into one symbol and transmits the modulation signal to the selection section 34. A first modulation section 51 performs QPSK modulation to the transmission signal S1 to modulate two bits of the transmission signal S1 into one symbol and transmits the modulation signal to the selection section 34.

The selection section 34 is selection-controlled by the selection control signal S5 from the retransmission control section 10C, and selects and outputs the 64-level QAM signal obtained from the second modulation section 52, when sending a normal transmission signal. In contrast to this, when a retransmission request is sent from the transmission/reception apparatus of the communication partner, the QPSK modulation signal obtained from the first modulation section 51 is selected and output.

A reception section 54 of the transmission/reception apparatus 50 demodulates the 64-level QAM signal to form six-bit demodulation data S7. The six-bit demodulation data S7 is input to a selection section 57. Higher four bits of the modulation data S7 are stored in memories 15, 16, 55, and 56.

The selection section 57 selects and rearranges demodulation data S7 from the reception section 54 and demodulation data comprising the higher four bits stored in the memories 15, 16, 55, and 56, based on the retransmission control signal S4 from the retransmission control section 10C.

Actually, when the retransmission timing signal S4 represents that retransmission is not currently performed, the selection section 57 selects demodulation data S7 comprising six bits output from the reception section 54 as it is, and sends it to the subsequent error correction section 17. In contrast to this, when the retransmission timing signal S4 represents that retransmission is currently performed, the selection section 14 selects modulation data comprising the retransmitted lower two bits and data comprising the higher four bits stored in the memories 15, 16, 55, and 56 at the time of initial transmission and arranges them, and transmits them to the subsequent error correction section 17.

Thus, according to the aforementioned configuration, the transmitting side modulates data comprising six bits or more into one symbol and transmits it at the time of general transmission using the M-ary modulation scheme that modulates data comprising six bits or more into one symbol, and retransmits only lower two bits susceptible to error when the retransmission request signal is received, thereby reducing the number of retransmission bits to ⅓ as compared with the case in which all bits are retransmitted as in the conventional case. Moreover, since only the bits susceptible to error are retransmitted, only the bits necessary to the retransmission can be substantially retransmitted and the number of retransmission bits can be effectively reduced without increasing the error rate.

Moreover, the receiving side receives the signal by which data comprising six bits or more is transmitted in one symbol and stores higher four bits of demodulated data, thereby restoring data arranged in the same manner as the transmission time from the retransmitted bits and the stored bits.

Embodiment 5

The feature of this embodiment lies in that a signal by which data comprising six bits or more is transmitted in one symbol is received, higher two bits of modulation data are stored in connection with the first retransmission signal, and next higher two bits are stored in connection with a next transmission signal of the same data.

Namely, in the case of considering 64-level QAM modulation, when an error occurs even if the higher four bits of the modulated six bits are stored at the first retransmission and the lower two bits are received at the retransmission, the third and fourth bits counting from the higher, susceptible to error next to the fifth and sixth bits, are also subject to retransmission, and only the higher two bits are stored in a memory section. As a result, the error rate at the second retransmission and afterward can be remarkably reduced and an increase in the number of retransmissions can be suppressed.

Figure 10:
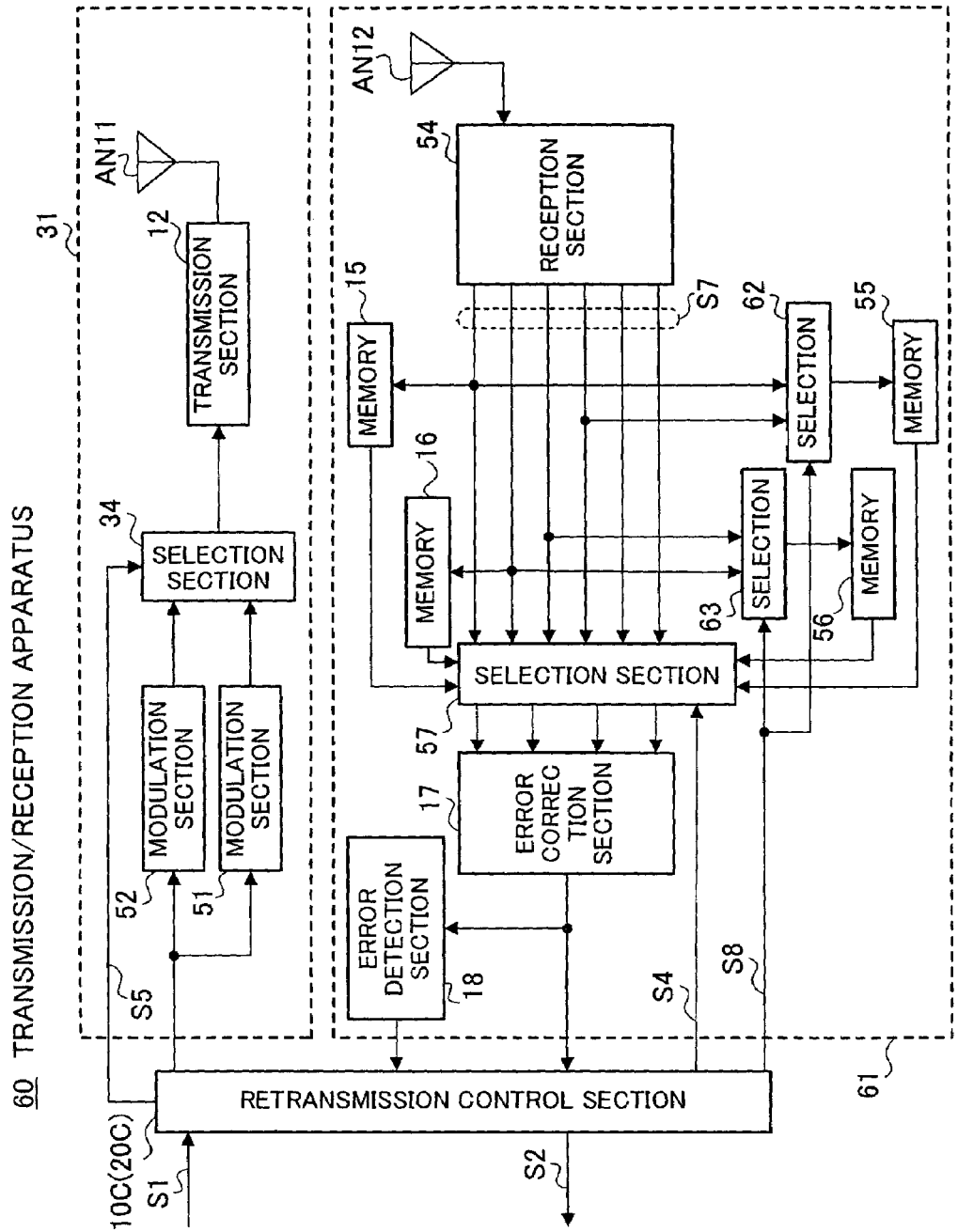
FIG. 10 is a block diagram illustrating a configuration of a transmission/reception apparatus according to Embodiment 5 of the present invention.

In FIG. 10 where the same reference numerals as those of FIG. 9 are added to the parts corresponding to FIG. 9, 60 as a whole shows a configuration of a transmission/reception apparatus according to Embodiment 5 of the present invention. The transmission/reception apparatus 60 is formed by the same configuration as Embodiment 4 except that the higher first and second bits are stored in the memories 56 and 55 in which demodulation data comprising next two bits (third and fourth bits counting from the higher) are stored when a second retransmission is performed.

In other words, modulation data comprising the higher second bit or the higher third bit is selectively stored in the memory 56 via a selection section 63, and modulation data comprising the higher first bit or the higher fourth bit is selectively stored in the memory 55 via a selection section 62.

The selection sections 62 and 63 select a bit to send to the memories 55 and 56 based on retransmission number information S8 from the retransmission control section 10C. More specifically, when retransmission number information S8 shows a zeroth retransmission (where a general transmission signal is received), the selection section 62 stores data comprising the fourth bit in the memory 55, and the selection section 63 stores data comprising the third bit in the memory 56.

Then, the lower two bits are received as a first retransmission signal and this is demodulated and input to the selection section 57. At this time, the data comprising the higher first bit stored at the first transmission, the data comprising the second bit, the data comprising the third bit, and the data comprising the fourth bit are input into the selection section 57, from the memories 15, 16, 56, and 55, respectively.

The selection section 57 arranges these bits in a predetermined order and outputs them to the error correction section 17. Then, when an error is detected by the error detection, the retransmission control section 10C requests the communication partner to retransmit a signal of the higher third, forth, fifth, and sixth bits upon the next retransmission. Moreover, the retransmission control section 10C sends retransmission number information S8 indicating a second time retransmission to the selection sections 62 and 63. Accordingly, the data comprising the higher first and the second bits, which are the same as that stored in the memories 15 and 16, are stored to the memories 56 and 55, respectively.

Then, the lower four bits are received as a second retransmission signal and this is demodulated and input to the selection section 57. At this time, the data comprising the higher first bit stored at the first transmission and the data comprising the second bit are input into the selection section 57, from the memories 15 and 55, and from the memories 16 and 56, respectively. The selection section 57 arranges these bits in a predetermined order and outputs them to the error correction section 17.

Thus, according to the aforementioned configuration, when an error occurs even if the higher four bits of the modulated six bits are stored at the first transmission and the lower two bits are received at the first retransmission, the third and fourth bits counting from the higher, susceptible to error next to the fifth and sixth bits, are also subject to retransmission, and only the higher two bits are stored in the memory section, thereby remarkably reducing the error rate at the second retransmission and afterward and suppressing an increase in the number of retransmissions. This enables to effectively reduce the number of retransmission bits without increasing the error rate.

Embodiment 6

The feature of this embodiment lies in that the number of retransmission bits is adaptively changed according to channel quality. As the channel quality deteriorates, the probability increases that an error will occur even with a bit not readily susceptible to error. Accordingly, as compared with the case in which the retransmitting bits are fixed, the number of retransmitting bits is adaptively changed according to the channel quality so as to further improve both the error rate characteristic and transmission efficiency.

More specifically, the better the channel quality, the more the number of bits for requesting retransmission decreases, and the number of higher bits to store increases. In other words, good channel quality means that the propagation path is not readily susceptible to error, and, since it can be considered that the error rate does not increase even if the number of retransmission bits is reduced, the number of retransmission bits is reduced. As a result, the number of retransmission bits can be effectively reduced.

In this embodiment, a signal level of the received signal is detected as channel quality. Then, at the retransmission signal receiving side, a retransmission request signal, which instructs to retransmit fewer lower bits when the received signal level is higher, is transmitted and the number of higher bits to be stored is increased as the received signal level increases.

Namely, when the received signal level is high, the distance between the symbol of demodulation target at the time of demodulation and the amplitude threshold level increases, and an error is less likely to occur, so that the error rate does not increase even if the number of retransmitting lower bits is reduced. As a result, the number of retransmission bits can be effectively reduced.

Figure 11:
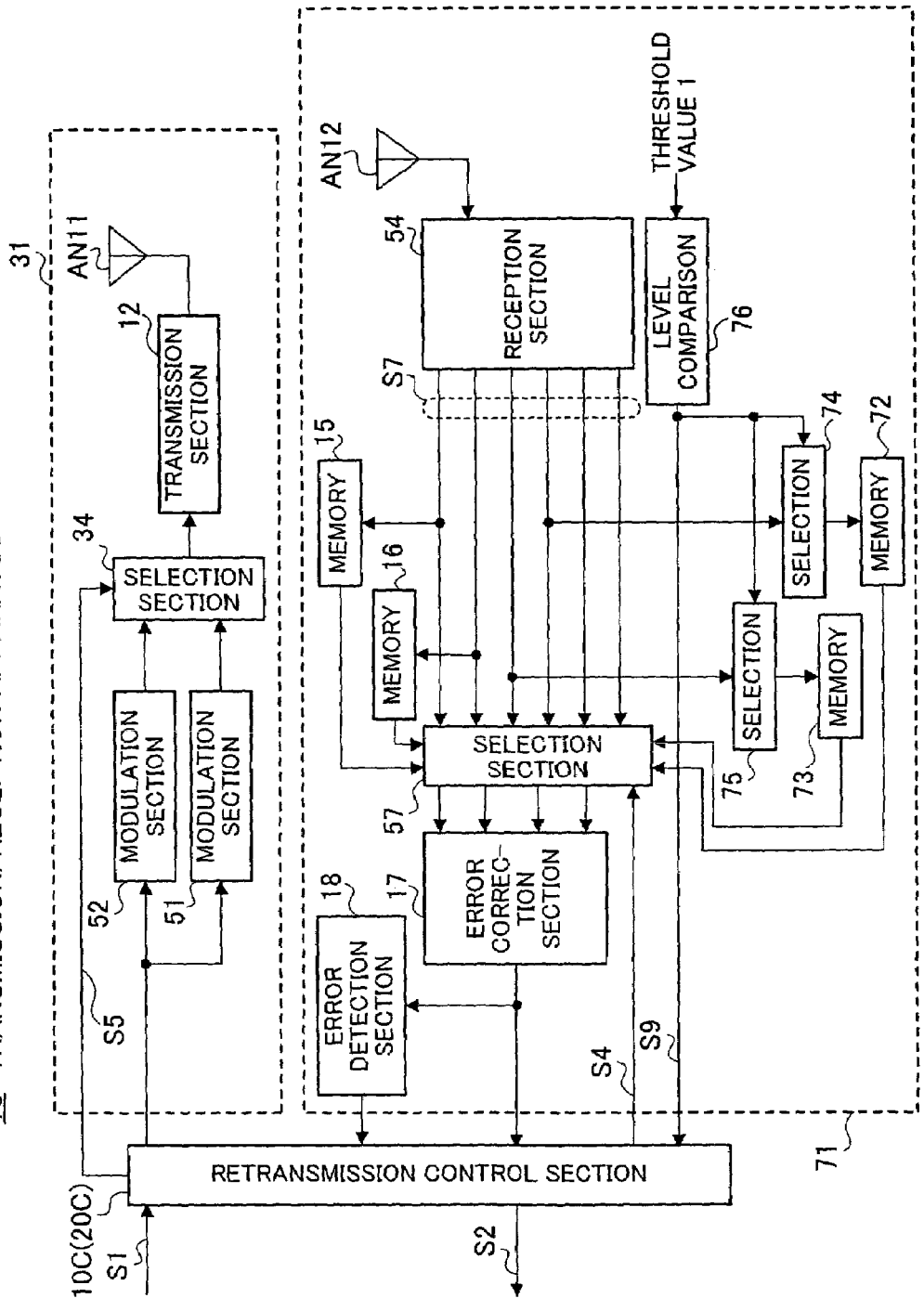
FIG. 11 is a block diagram illustrating a configuration of a transmission/reception apparatus according to Embodiment 6 of the present invention.

In FIG. 11 where the same reference numerals as those of FIG. 9 are added to the parts corresponding to FIG. 9, 70 as a whole shows a configuration of a transmission/reception apparatus according to Embodiment 6 of the present invention. The transmission/reception apparatus 70 includes a magnitude comparison section 76 that compares a received signal level with a threshold level 1. RSSI information representing a received signal level is input to the magnitude comparison section 76 from the reception section 54.

The magnitude comparison section 76 compares the received signal level with the threshold level 1 based on RSSI information, and transmits a comparison result signal S9 to selection sections 74 and 75 and the retransmission control section 10C. When the comparison result indicates that the reception level is higher, the selection sections 74 and 75 store the higher fourth bit and the third bit in memories 72 and 73, respectively. In contrast to this, when the comparison result indicates that the reception level is lower, the higher fourth bit and the third bit are not stored in memories 72 and 73, respectively.

When the comparison result indicates that the reception level is higher, the retransmission control section 10C makes a retransmission request instructing the radio station of the communication partner to retransmit only the lower two bits. In contrast to this, when the comparison result indicates that the reception level is lower, a retransmission request is issued that instructs the radio station of the communication partner to retransmit the lower four bits.

In the aforementioned configuration, when receiving a first transmission signal, the transmission/reception apparatus 70 stores the higher two bits of modulation data S7 in the memories 15 and 16. Moreover, when the received signal level is higher than threshold level 1, the data comprising the higher third bit and the fourth bit are stored in the memories 73 and 72 via the selection sections 74 and 75.

Then, the retransmission control section 10C makes a retransmission request instructing the radio station of the communication partner to retransmit only the lower two bits. The retransmitted and received lower two bits and the higher four bits stored in the memories 15, 16, 72 and 73 by the selection section 57 are rearranged in a predetermined order and output.

In contrast to this, when the received signal level is lower than threshold level 1, data comprising the higher third bit and that of the fourth bit are not stored to the memories 73 and 72. Moreover, the retransmission control section 10C makes a retransmission request instructing the radio station of the communication partner to retransmit the lower four bits. The retransmitted and received lower four bits and the higher two bits stored in the memories 15 and 16 by the selection section 57 are rearranged in a predetermined order and output.

Thus, according to the aforementioned configuration, the number of retransmission bits is adaptively changed according to channel quality, thereby realizing the transmission/reception apparatus 70 that can further improve both the error rate characteristic and transmission efficiency.

Embodiment 7

The feature of this embodiment lies in taking multipath delay time into account in selecting the number of retransmitting bits. This enables to improve both the error rate characteristic and transmission efficiency when multipath delay time is longer, in comparison to Embodiment 6.

As a method for detecting multipath delay time, this embodiment adopts a method in which the difference in reception level between adjacent subcarriers is detected by detecting the amount of delay dispersion.

Figure 12:
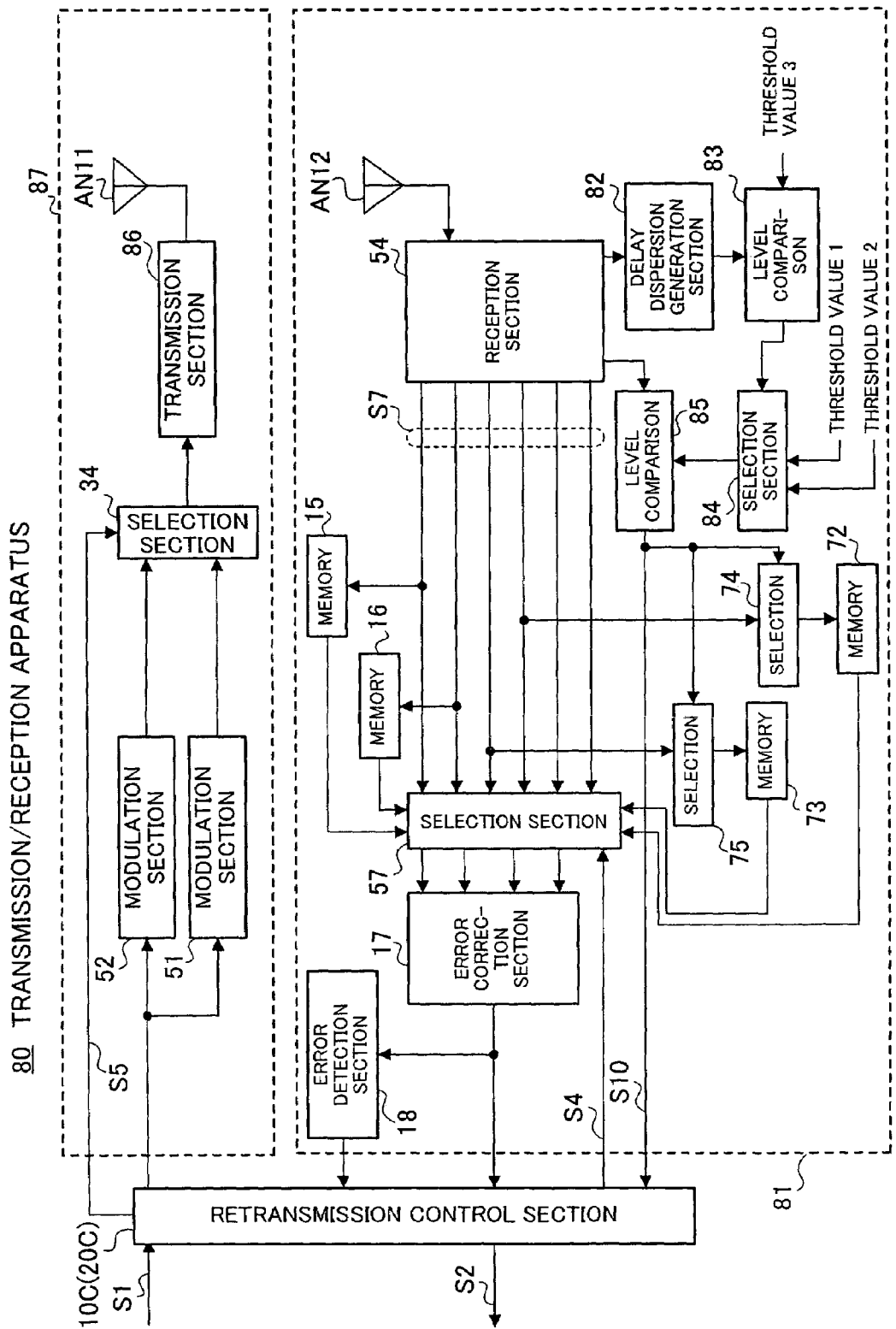
FIG. 12 is a block diagram illustrating a configuration of a transmission/reception apparatus according to Embodiment 7 of the present invention.

In FIG. 12 where the same reference numerals as those of FIG. 11 are added to the parts corresponding to FIG. 11, 80 as a whole shows a configuration of a transmission/reception apparatus according to Embodiment 7 of the present invention. A reception and demodulation section 81 of the transmission/reception apparatus 80 sends an FFT output result about, for example, a propagation path estimation preamble from the reception section 54 to a delay dispersion generating section 82.

Figure 13:
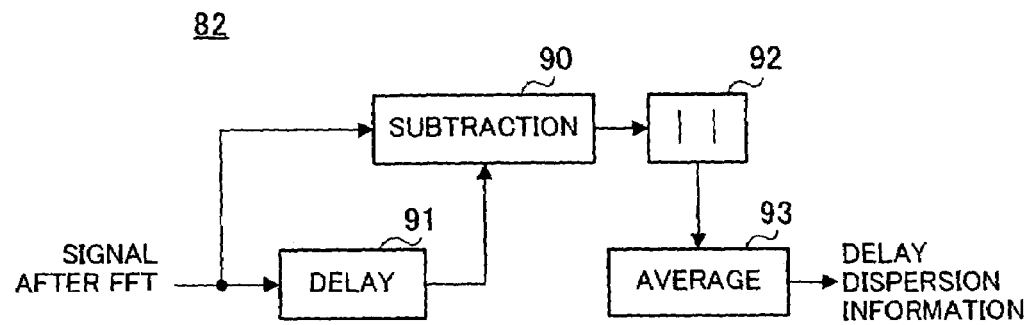
FIG. 13 is a block diagram illustrating a confirmation of a delay dispersion generating section.

The delay dispersion generating section 82 is configured as illustrated in FIG. 13. In other words, the delay dispersion generating section 82 inputs the signal after FFT to a subtracting circuit 90 and inputs it to the subtracting circuit 90 via a delay circuit 91. Accordingly, the subtracting circuit 90 calculates a difference in signal level between the adjacent subcarriers.

Figure 14A:
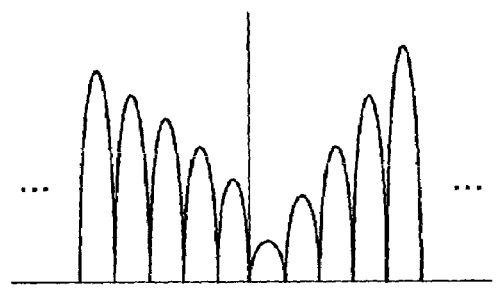
FIG. 14A is a block diagram illustrating an OFDM signal with a small delay dispersion.

The subtraction result is transmitted to an averaging circuit 93 via an absolute valuing circuit 92. As a result, delay dispersion information including an average of differences between the adjacent subcarriers is output from the averaging circuit 93. Here, as illustrated in FIG. 14A, when the delay dispersion is small, the difference in reception level between the adjacent subcarriers decreases.

Figure 14B:
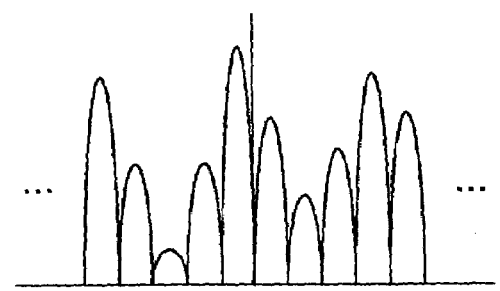
FIG. 14B is a block diagram illustrating an OFDM signal with a large delay dispersion.

In contrast to this, when the delay dispersion is large, the difference in reception level between the adjacent subcarriers increases as illustrated in FIG. 14B. In other words, the higher the output from the averaging circuit 93, the larger the delay dispersion.

Delay dispersion information obtained by the delay dispersion generating section 82 is compared in terms of magnitude with threshold level 3 by a magnitude comparison section 83, and the comparison result is sent to a selection section 84. Two threshold levels are input to the selection section 84, and one of them is selected according to the comparison result. Here, it is assumed that the relationship between threshold level 1 and threshold level 2 is equivalent to the relationship: threshold level 1>threshold level 2.

Actually, when the comparison result, which shows that the amount of delay dispersion is larger than threshold level 3, is obtained, larger threshold level 1 is selected and transmitted to a magnitude comparison section 85. In contrast to this, when the comparison result to show that the amount of delay dispersion decreases than threshold level 3, is obtained, smaller threshold level 2 is selected and transmitted to the magnitude comparison section 85.

RSSI information representing a received signal level is input to the magnitude comparison section 85 from the reception section 54. The magnitude comparison 85 compares the received signal level with threshold level 1 or threshold level 2 based on the RSSI information, and transmits a comparison result signal S10 to the selection sections 74 and 75 and the retransmission control section 10C. The subsequent processings are the same as in aforementioned embodiment 6.

In this way, considering that as the delay dispersion decreases, or as the received signal level decreases, the probability of transmission error decreases, the transmission/reception apparatus 80 performs the selection of the threshold level of the received signal level and the comparison between the received signal level and the threshold level. Then, the number of retransmission bits is selected according to the comparison result.

That is to say, the number of retransmission bits reflects both the amount of delay dispersion and the received signal level. As a result, the number of retransmission bits can be reduced more effectively without increasing the error rate.

Embodiment 8

The feature of this embodiment lies in that information obtained by normalizing delay dispersion information by received level information is used as multipath delay time. This makes it possible to generate more accurate delay dispersion information even if AGC (Automatic Gain Control) error exists in the reception section.

In the actual radio communications, the AGC error exists in the reception section. When the AGC error exists in the reception section, an error occurs in delay dispersion information. However, delay dispersion information is normalized by received level information to make it possible to prevent an error from occurring in delay dispersion information even if the AGC error exists.

Figure 15:
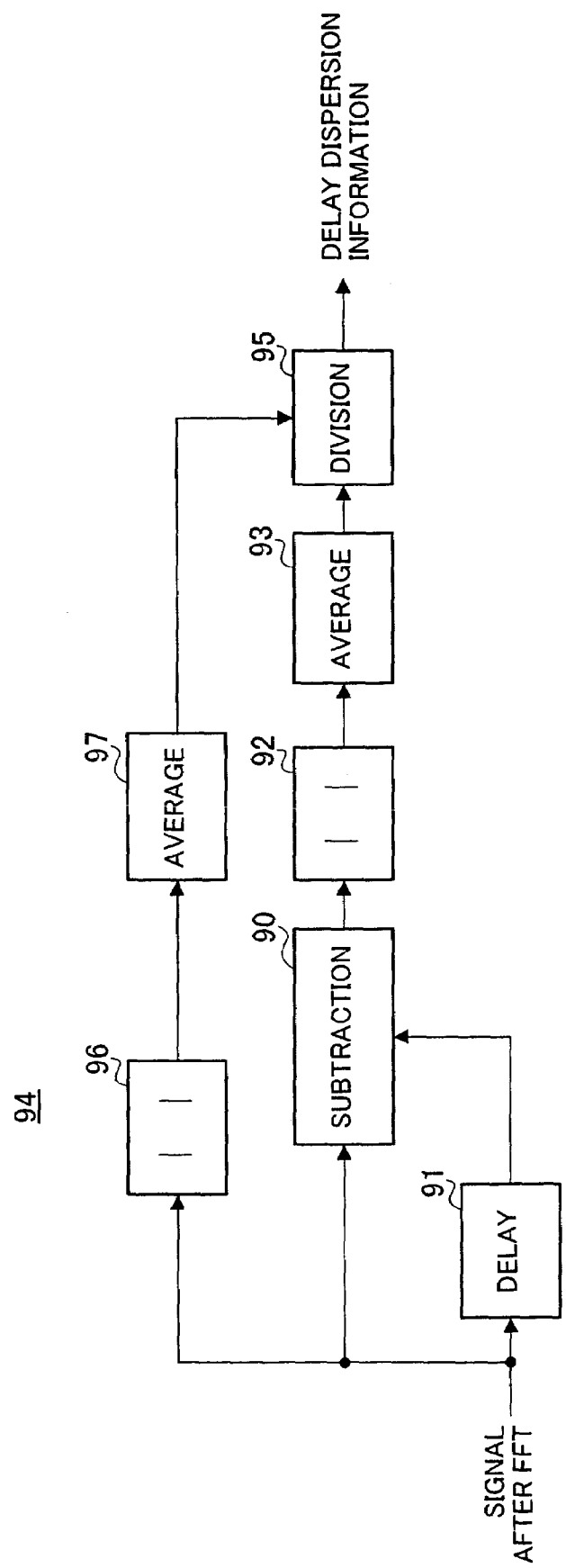
FIG. 15 is a block diagram illustrating a configuration of a delay dispersion generating section according to Embodiment 8 of the present invention.

A specific configuration of a delay dispersion generating section according to this embodiment is illustrated in FIG. 15. A delay dispersion generating section 94 inputs the signal after FFT to the subtracting circuit 90 and inputs it to the subtracting circuit 90 via the delay circuit 91. Accordingly, the subtracting circuit 90 calculates a difference in signal level between the adjacent subcarriers.

The subtraction result is transmitted to the averaging circuit 93 via the absolute valuing circuit 92. As a result, an average-level of the difference between the adjacent subcarriers is sent to a division circuit 95 from the averaging circuit 93. Moreover, the signal after FFT is input to the division circuit 95 via an absolute valuing circuit 96 and an averaging circuit 97. The division circuit 95 divides the average level of the difference in the adjacent subcarriers by the averaged FFT signal, thereby outputting normalized delay dispersion information normalized.

Thus, according to the aforementioned configuration, it is possible to suppress an error in the amount of delay dispersion due to an error of a received signal amplifying circuit. As a result, since the likelihood of occurrence of transmission error can be accurately estimated, the number of retransmission bits can be accurately selected, and the number of retransmission bits can be accurately reduced without increasing the error rate according to substantial propagation path environment.

Embodiment 9

The feature of this embodiment lies in that only the bits punctured at the time of initial transmission are transmitted at the time of retransmission. Since this results in actually transmitting only the bits that are effective to improve the error rate at the time of retransmission, retransmission efficiency can be improved.

In the actual radio communications, a technique is used whereby puncturing is performed after executing convolutional coding at the time of transmission to reduce the number of bits and improve transmission efficiency.

Figure 16:
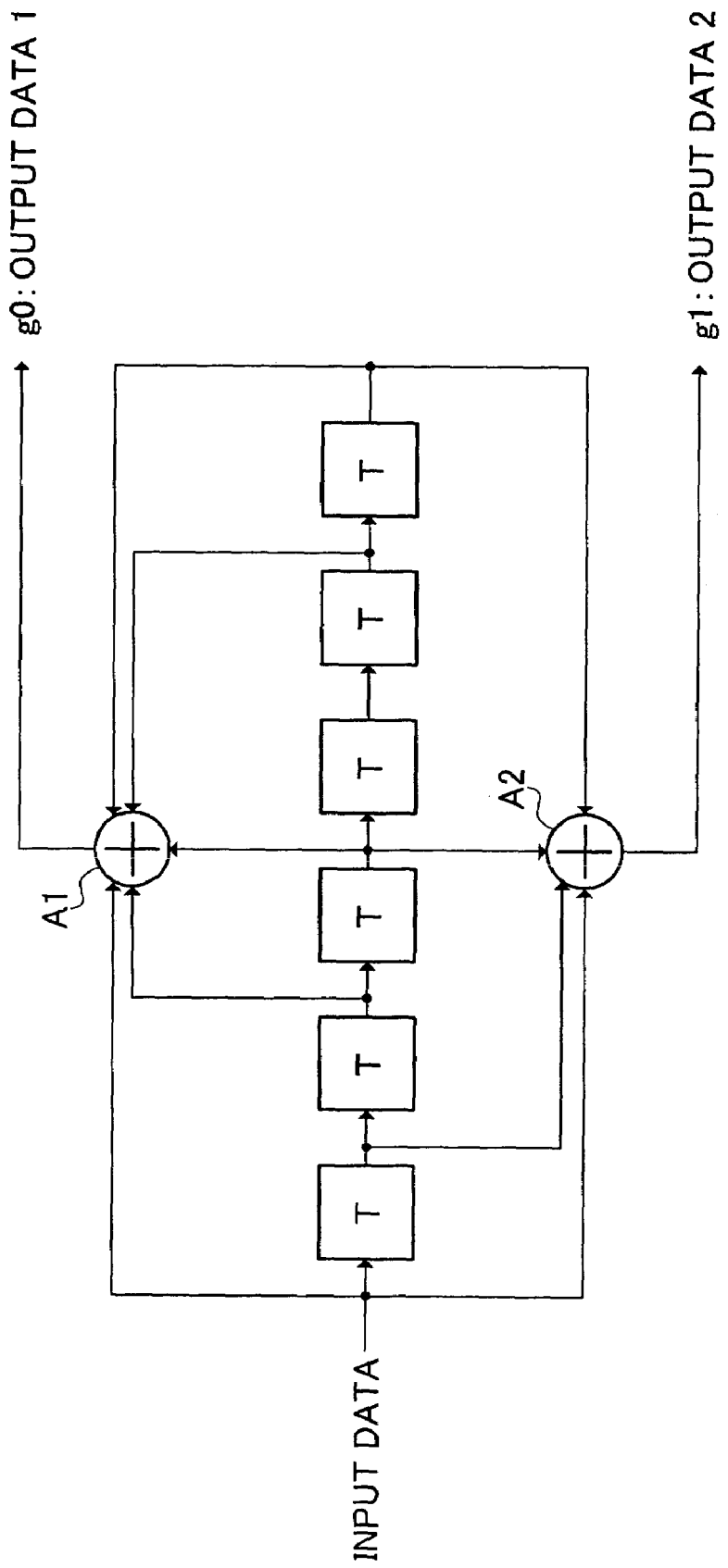
FIG. 16 is a block diagram illustrating a configuration of a convolutional coder.
Figure 17:
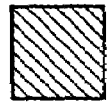
FIG. 17A is a view illustrating input data to a convolutional coder.
FIG. 17B is a view illustrating output data from a convolutional coder.
FIG. 17C is a view illustrating data subjected to puncturing after convolutional coding.

FIG. 16 illustrates a configuration of a convolutional coder having a code rate of ½ and a constraint length of 7. In the convolutional coder, input data is input to shift registers T connected in series and outputs of the shift registers T are selectively added by adders A1 and A2 to obtain convolutional coder output data g0 and g1. FIG. 17A and FIG. 17B illustrate the relationship between input data and output data of the convolutional coder of FIG. 16. Moreover, FIG. 17C illustrates an example of data when puncturing processing is performed after convolutional coding-processing. FIG. 17C shows punctured data g0' and g1' when puncturing processing is performed at a code rate of ¾.

Here, since the punctured bits are not actually transmitted, there is need to reduce signal likelihood the most at the time of error correction. Accordingly, in general, at the time of reception, a null signal is inserted at a bit position where puncturing is performed at the time of transmission.

In this embodiment, upon transmission, the bits punctured at the time of initial transmission, namely, bits A2, A5, A8, . . . B1, B4, B7, . . . in FIG. 17B, alone are transmitted. For example, when convolutional coding is used and the code rate is ¾, ⅓ of all information is punctured, so that only the amount of retransmission information of ⅓ will suffice. When the code rate is further reduced, the amount of retransmission information may be smaller. For example, according to MMAC (Multimedia Mobile Access Communication system) standard, the code rate of 9/16 is also used. However, in this case, if the method of this embodiment is applied, the amount of retransmission information can be further reduced.

In this way, if the method of this embodiment is applied, particularly, the smaller the code rate, the more transmission efficiency can be improved.

Figure 18:
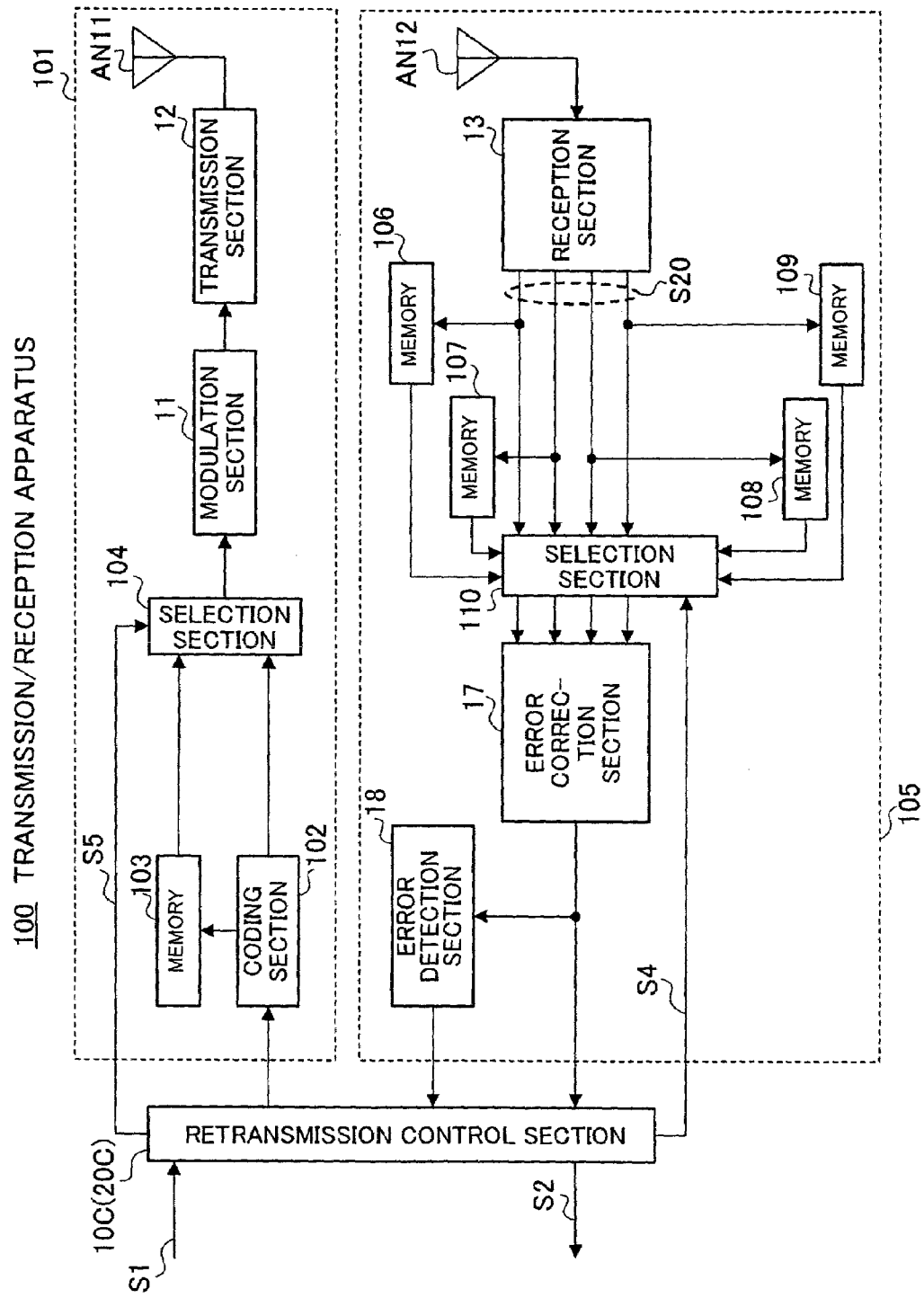
FIG. 18 is a block diagram illustrating a configuration of a transmission/reception apparatus according to Embodiment 9 of the present invention.

A specific configuration of the transmission/reception apparatus according to this embodiment is illustrated in FIG. 18. In FIG. 18 where the same reference numerals as those of FIG. 2 explained in Embodiment 1 are added to the parts corresponding to FIG. 2, 100 as a whole shows a configuration of a transmission/reception apparatus according to Embodiment 9 of the present invention as a whole.

A modulation transmission section 101 of the transmission/reception apparatus 100 includes a coding section 102 that performs convolutional coding processing and puncturing processing to transmission data. It also includes a memory 103 that stores data punctured by the coding section 102.

A selection section 104 is selection-controlled by a selection control signal S5 from the retransmission control section 10C, and, at the time of initial transmission, selects and outputs coding data, which is obtained by the coding section 102 and subjected to convolutional coding processing and puncturing processing. In contrast to this, at the time of retransmission, the puncture data stored in the memory 103 is selected and output.

Additionally, in aforementioned Embodiment 1, four bits were modulated into one symbol and transmitted at the time of initial transmission, and the lower two bits susceptible to error were transmitted at the time of retransmission. However, in this embodiment, four bits of coding data obtained by the coding section 102 is modulated into one symbol and transmitted at the time of initial transmission, and four bits of the puncture data stored in the memory 103 are modulated into one symbol and transmitted at the time of retransmission. Two bits of retransmitting puncture data may be, of course, modulated into one symbol by QPSK modulation, similar to Embodiment 1.

A reception/modulation section 105 of the transmission/reception apparatus 100 stores the bits of modulation data S20 modulated by the reception section 13 in memories 106 to 109. Actually, data, which is sent at the time of initial transmission and subjected to convolutional processing and puncturing processing, is stored in the memories 106 to 109.

When the retransmission timing signal S4 represents that retransmission is not currently performed (namely, a case of showing an initial transmission), a selection section 110 selects four-bit demodulation data S20 (data subjected to convolutional coding processing and puncturing processing) output from the reception section 13 as it is, and sends it to the subsequent error correction section 17. In contrast to this, when the retransmission timing signal S4 represents that retransmission is currently performed, the selection section 110 selects and arranges retransmitted puncture data and data stored in the memories 106 to 109 at the time of initial transmission, and transmits them to the subsequent error correction section 17.

Namely, the error correction section 17 performs error correction processing using data subjected to convolutional coding processing and puncturing processing at the time of initial transmission, while, at the time of retransmission, performing error correction processing using punctured data in addition to the above data. This improves error correction capacity at the time of retransmission and improves the error rate.

Thus, according to the aforementioned configuration, since only the bits punctured at the time of initial transmission are transmitted at the time of retransmission, thereby transmitting only bits effective to substantially improve the error rate at the time of retransmission, and improving retransmission efficiency.

Embodiment 10

The feature of this embodiment lies in that the bits punctured at the time of initial transmission as explained in Embodiment 9 and lower bits (lower two bits in this embodiment) susceptible to error, as explained in Embodiment 1, are transmitted at the time of retransmission. This makes it possible to further improve the error rate characteristic without reducing retransmission efficiency so much as compared with Embodiment 9.

Additionally, though the amount of retransmitting information increases as compared with Embodiment 9, the amount of retransmitting information can be reduced significantly as compared with the conventional method. For example, when the convolutional coder is used and the code rate is $3/4$, $1/3$ of the total amount of information is punctured. Here, since the use of the modulation scheme and code rate having good quality is generally required for the signal for retransmission, both all bits transmitted at the initial time and bits punctured at the initial transmission are transmitted at the time of retransmission, in the conventional method. Accordingly, according to the method of this embodiment, the amount of retransmitting information is $2/3$ as compared with the conventional method. When the code rate is further reduced, the amount of retransmitting information may be smaller.

Figure 19:
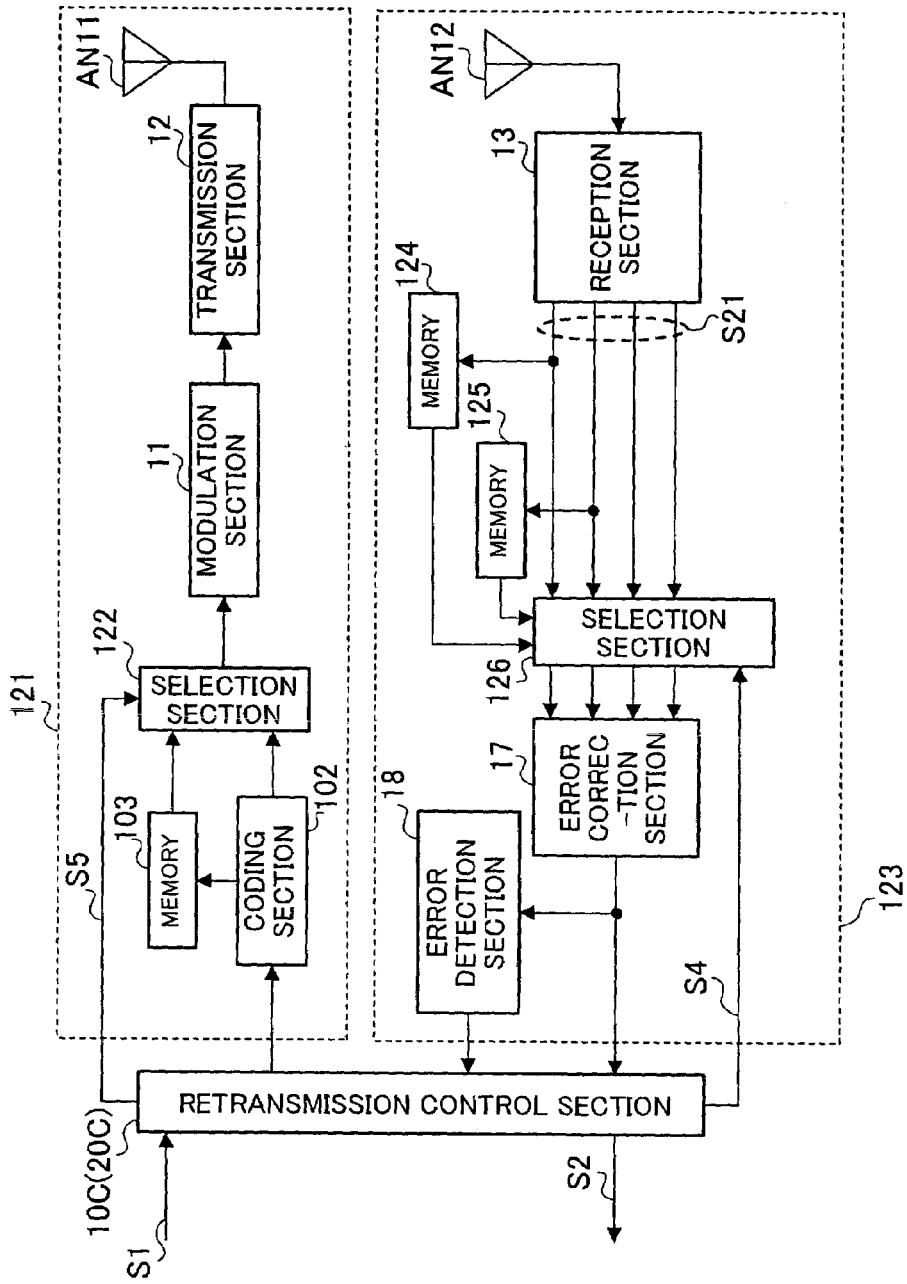
FIG. 19 is a block diagram illustrating a configuration of a transmission/reception apparatus according to Embodiment 10 of the present invention.

A specific configuration of the transmission/reception apparatus according to this embodiment is illustrated in FIG. 19. In FIG. 19 where the same reference numerals as those of FIG. 18 explained in Embodiment 9 are added to the parts corresponding to FIG. 18, 120 as a whole shows a configuration of a transmission/reception apparatus according to Embodiment 10 of the present invention. Here, only the parts where processing different from that of Embodiment 9 is performed will be explained. At the time of initial transmission, a selection section 122 of a modulation transmission section 121 selects and outputs coding data obtained by the coding section 102 and subjected to convolutional coding processing and puncturing processing. In contrast to this, at the time of retransmission, data stored in the memory 103 and punctured and the lower two bits modulated by the modulation section 11 and susceptible to error at the time of initial transmission are selected and output.

Accordingly, the modulation section 11 performs modulation processing (in this embodiment, four bits are modulated into one symbol) to coding data subjected to convolutional processing and puncturing processing at the time of initial transmission, and modulates the punctured data and the coded bits, susceptible to error, at the time of retransmission.

The higher two bits, which are not readily susceptible to error and obtained by receiving and modulating the initial transmission signal, are stored in memories 124 and 125 of a reception/modulation section 123.

When the retransmission timing signal S4 represents that retransmission is not currently performed (namely, a case of showing an initial transmission), a selection section 126 selects four-bit demodulation data S21 (data subjected to convolutional coding processing and puncturing processing) output from the reception section 13 as it is, and sends it to the subsequent error correction section 17. In contrast to this, when the retransmission timing signal S4 represents that retransmission is currently performed, the selection section 126 selects the bits that are stored in the memories 124 and 125 and not readily susceptible to error, together with modulation data S21 including bits susceptible to error, and transmits them to the error correction section 17.

Namely, the error correction section 17 performs error correction processing using data subjected to convolutional coding processing and puncturing processing at the time of initial transmission, while, at the time of retransmission, performing correction processing using the punctured data and bits susceptible to error in addition to the above data. This further improves error correction capacity at the time of retransmission by the amount corresponding to the retransmission of the bits susceptible to error, and improves the error rate characteristic as compared with Embodiment 9.

Thus, according to the aforementioned configuration, the punctured bits and the bits susceptible to error are transmitted at the time of retransmission, thereby further improving the error rate characteristic without increasing the amount of retransmitting information so much in addition to the effect of Embodiment 9.

Additionally, this embodiment explained a case where only one modulation section 11 is provided and the same modulation scheme is used at the time of initial transmission and retransmission. However, the present invention is not limited to this, and a plurality of modulation sections having different modulation levels may be provided and the modulation scheme with a smaller modulation level than initial transmission may be used at the time of retransmission. This enables to further improve the error rate characteristic at the time of retransmission. This also applies to the following embodiments.

Embodiment 11

This embodiment will consider a case where bits punctured at the time of initial transmission and bits that are susceptible to error are transmitted as a retransmitting signal, similar to Embodiment 10. However, in this embodiment, instead of transmitting both of these bits at one retransmission, either punctured bits or error-susceptible bits are transmitted at one transmission. Then, when an error is detected at the initial retransmission, the bits of the other are transmitted at a next retransmission. Since this makes it possible to reduce the amount of retransmission information at one retransmission as compared with Embodiment 10, both transmission efficiency and the error rate characteristic can be further improved.

When the amount of retransmission information increases, the retransmission efficiency naturally decreases, and transmission efficiency decreases. Depending on the channel quality, if one of the bits that are susceptible to error (in this embodiment, bits other than the first and second bits in each symbol) and the bits punctured at the time of transmission are transmitted, data can be correctly restored in some cases. In this embodiment, attention is paid to this point, and when either one of them is retransmitted and still results in an error, the other is retransmitted. This makes it possible to improve both transmission efficiency and the error rate characteristic.

Figure 20:
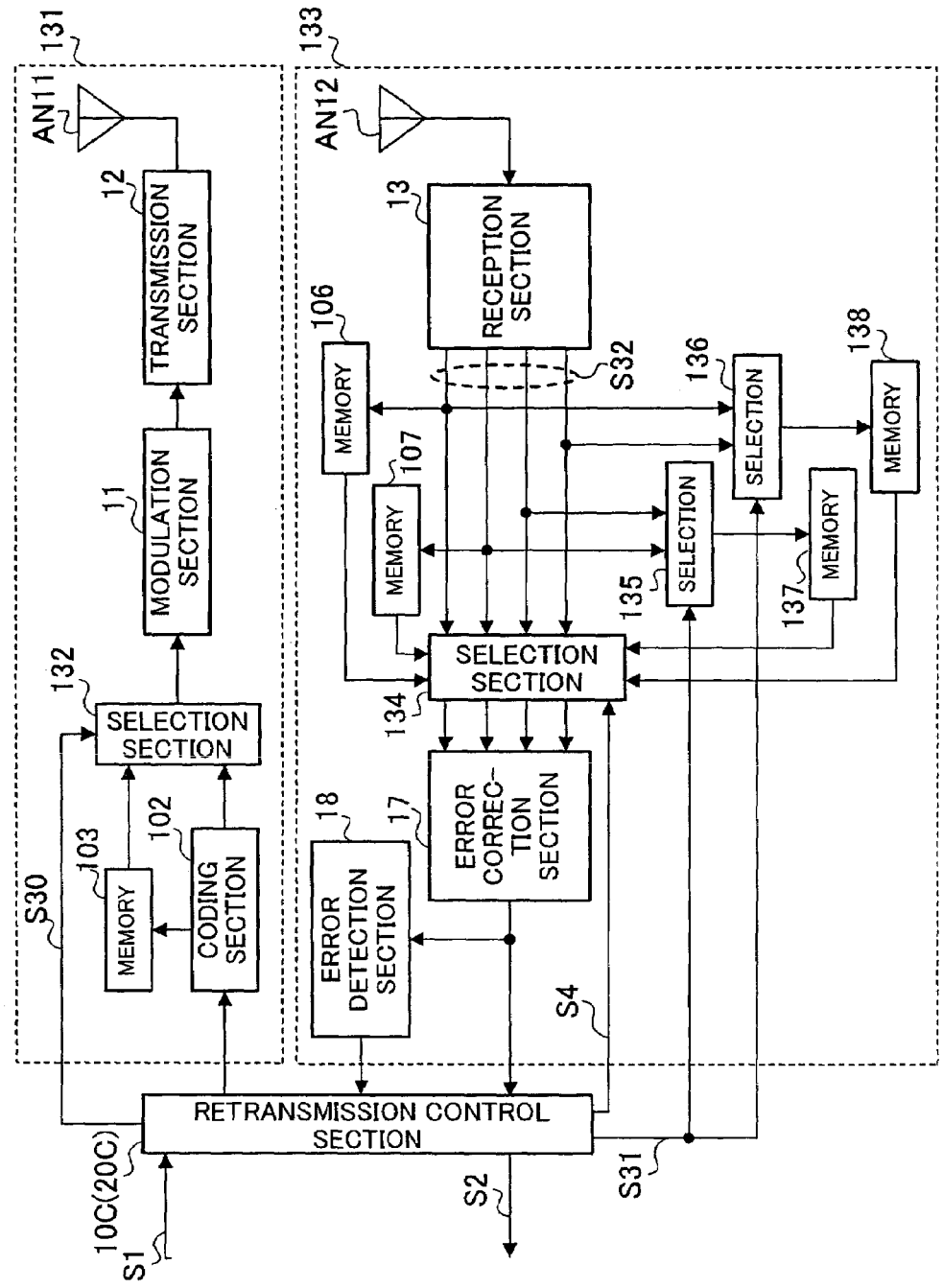
FIG. 20 is a block diagram illustrating a configuration of a transmission/reception apparatus according to Embodiment 11 of the present invention.

A specific configuration of the transmission/reception apparatus according to this embodiment is illustrated in FIG. 20.

In FIG. 20 where the same reference numerals as those of FIG. 19 explained in Embodiment 10 are added to the parts corresponding to FIG. 19, 130 as a whole shows a configuration of a transmission/reception apparatus according to Embodiment 11 of the present invention.

A modulation/transmission section 131 of the transmission/reception apparatus 130 transmits retransmission number information S30 representing the number of retransmissions to a selection section 132 from the retransmission control section 10C (20C). When the number of retransmissions is 0, namely, the first transmission, the selection section 132 selects and outputs coding data subjected to convolutional coding processing and puncturing processing from the coding section 102.

Moreover, when the number of retransmissions is 1, the selection section 132 again selects and outputs only lower two bits of the four bits output from the coding section 102 that are susceptible to error. In other words, the modulation section 11 collects only the two bits that are susceptible to error, and modulates four bits into one symbol, at the time of the selected initial transmission.

Furthermore, when the number of retransmissions is 2, the selection section 132 selects and outputs the punctured data stored in the memory 103.

In a reception/modulation 133, retransmission number information S31 representing the number of retransmissions is input into selection sections 135 and 136, which selects bits to be stored to memories 137 and 138, from the retransmission control section 10C (20C).

When the number of retransmissions is 0, that is, upon receiving the first transmission signal, the selection sections 135 and 136 select higher two bits of demodulation data S32 output from the reception section 13 that are susceptible to error, and outputs them to the memories 137 and 138. Here, though the higher two bits are also stored in the memories 106 and 107, data corresponding to different time points are stored in the memories 137 and 138, and the memories 106 and 107. In this way, the higher two bits of the initial received data are all stored in the memories 106, 107, 137, and 138.

Moreover, when the number of retransmissions is 1, the selection sections 135 and 136 select two bits of demodulation data S32 output from the reception section 13 that are different from the two bits stored in the memories 106 and 107, and outputs them in the memories 137 and 138. In this way, the first retransmitted data, namely, the bits that are susceptible to error, is all stored in the memories 106, 107, 137, and 138.

A selection section 134 selects demodulation data S32 from the reception section 13 and outputs it at the initial transmission signal receiving time, and selects demodulation data S32 and data stored in the memories 106, 107, 137, and 138 and outputs them to the error correction section 17 at the time of retransmission. More specifically, at the time of first retransmission, the retransmitted bits susceptible to error and bits stored in the memories 106, 107, 137, and 138 that are not readily susceptible to error are input to the error correction section 17. At the time of second retransmission, the retransmitted punctured bits and the first retransmission bits stored in the memories 106, 107, 137, and 138 are input to the error correction section 17.

As a result, upon receiving the first retransmission signal, the error correction section 17 can receive the bits susceptible to error by the retransmission and error-correct them, and, when an error is still detected, the error correction section 17 can receive the punctured bits and error-correct them upon receiving the second retransmission signal.

Thus, according to the aforementioned configuration, either bits that are susceptible to error or bits punctured at the time of transmission are transmitted in response to a first retransmission request, and the other bits are transmitted in response to a next retransmission request. Since this makes it possible to reduce the amount of retransmission information at one retransmission as compared with Embodiment 10, both transmission efficiency and the error rate characteristic can be further improved.

In addition, this embodiment explained the case in which only the bits susceptible to error were retransmitted first and the bits punctured at the time of transmission were retransmitted next. However, the present invention is not limited to this and the bits punctured at the time of transmission may be retransmitted first and the bits susceptible to error may be retransmitted next.

Embodiment 12

The feature of this embodiment lies in that the processings explained in Embodiment 10 and the processings explained in Embodiment 11 are adaptively switched according to the channel quality. This makes it possible to further improve both transmission efficiency and the error rate characteristic as compared with Embodiment 10 and Embodiment 11.

The present inventor believes that which one of Embodiment 10 and Embodiment 11 enhances overall system throughput depends on channel quality. Generally, when the channel quality is good, since the probability is high that retransmission will be completed at one time, either punctured bits or bits that are susceptible to error are transmitted at one retransmission, so as to reduce the amount of retransmission information at one retransmission. Meanwhile, since excellent error correction capacity is desirable to complete the retransmission at one time as the channel quality becomes poor, both the punctured bits and the bits susceptible to error are transmitted at one retransmission. As a result, the amount of retransmission information and the number of retransmissions can be reduced effectively to improve retransmission efficiency.

Accordingly, Embodiment 10 and Embodiment 11 are adaptively switched according to the channel quality, thereby further improving both transmission efficiency and the error rate characteristic as compared with Embodiments 10 and 11.

Figure 21:
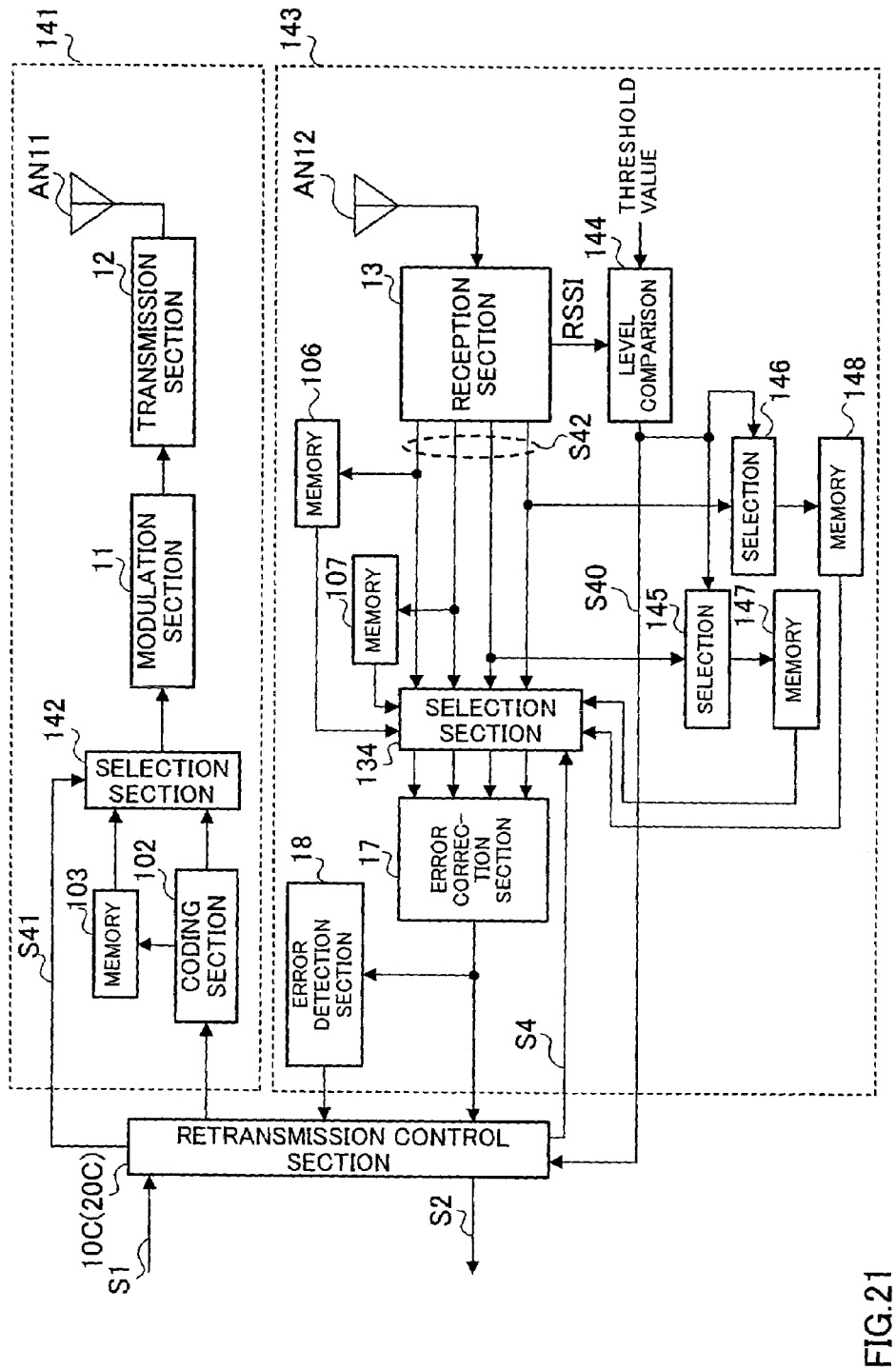
FIG. 21 is a block diagram illustrating a configuration of a transmission/reception apparatus according to Embodiment 12 of the present invention.

A specific configuration of the transmission/reception apparatus according to this embodiment is illustrated in FIG. 21.

In FIG. 21 where the same reference numerals as those of FIG. 20 explained in Embodiment 11 are added to the parts corresponding to FIG. 20, 140 as a whole shows a configuration of a transmission/reception apparatus according to Embodiment 12 of the present invention.

A reception/demodulation section 143 of the transmission/reception apparatus 140 includes a magnitude comparison section 144 as a channel quality detection section that compares the level of RSSI (Received Signal Strength Indicator) obtained by the reception section 13 with a threshold level. Additionally, in this embodiment, though the channel quality is detected based on RSSI, the channel quality may be detected using CIR (Carrier to Interface Ratio), SIR (Signal to Interface Ratio), and the like.

The comparison result obtained by the magnitude comparison section 144 is transmitted to selection sections 145 and 146 and the retransmission control section 10C (20C). In addition, the magnitude comparison section 144 performs a magnitude comparison of RSSI of the signal at the time of initial transmission. Moreover, though FIG. 21 illustrates that the comparison result is input to the retransmission control section of the own station in order to simplify the figure, this is actually transmitted to the retransmission control section of the communication partner station.

The retransmission control section 10C (20C) changes a selection control signal S41 to send to the selection section 142 and changes data selected by the selection section 142 according to the level of RSSI of the partner station in addition to whether a retransmission request is sent from the partner station.

More specifically, at the time of initial transmission, the selection section 142 selects and outputs coding data obtained by the coding section 102 and subjected to convolutional coding processing and puncturing processing. When RSSI is higher than the threshold level and a retransmission request is sent, only either one of the bits that are susceptible to error and the bits punctured at the time of transmission (error-susceptible bits, in this embodiment) are selected and output at the time of first retransmission. Moreover, the other bits (punctured bits, in this embodiment) are selected and output at the time of second retransmission.

In contrast to this, when RSSI is less than the threshold level and a retransmission request is sent, both the bits that are susceptible to error and the bits punctured at the time of transmission are selected and output at the time of first retransmission.

An explanation will be next given of the reception/demodulation section 143. The selection sections 145 and 146 of the reception/demodulation section 143 store the lower two bits of demodulation data S42 in memories 147 and 148 when the comparison result in which RSSI is less than the threshold level is obtained from the magnitude comparison section 144.

As a result, at the initial transmission signal receiving time, the higher two bits are stored in the memories 106 and 107, and when RSSI is low, the lower two bits are stored in the memories 147 and 148.

Then, when RSSI is low at the first retransmission signal receiving time, the retransmitted bits susceptible to error and the bits punctured at the time of transmission, and all bits stored in the memories 106, 107, 145, and 146 at the time of initial transmission are input to the error correction section 17 via the selection section 134.

In contrast to this, when RSSI is high when the first retransmission signal is received, the retransmitted error-susceptible bits and the bits stored in the memories 106 and 107 that are not readily susceptible to error from the initial transmission, are input into the error correction section 17 via the selection section 134.

Thus, according to the aforementioned configuration, when the channel quality is good, either the bits that are susceptible to error or the bits that are punctured at the time of transmission are selected and transmitted at the time of retransmission, and when the channel quality is poor, both the bits susceptible to error and the bits punctured at the time of transmission are selected and transmitted at the time of retransmission. This makes it possible to further improve both transmission efficiency and the error rate characteristic as compared with Embodiment 10 and Embodiment 11.

Embodiment 13

The feature of this embodiment lies in the point that the retransmission method of the present invention explained in the aforementioned Embodiments 1 to 12 is applied to only a forward link. This makes it possible to reduce the hardware scale of the base station without decreasing the overall system throughput as compared with Embodiments 1 to 12.

The present inventor believes that it is desirable to apply the retransmission method of the present invention explained in conjunction with Embodiments 1 to 12 to the forward link alone, for the following reasons. Firstly, the forward link is dominant in the overall system throughput. For this reason, even if the present invention is applied to a reverse link, high effect cannot be expected. Secondly, when the retransmission method explained in Embodiments 1 to 12 is applied to the reverse link, the base station is required to store the received signals of all terminals in the memory, so that the memory capacity of the base station increases considerably. In consideration of these points, in this embodiment, the above-described retransmission method is applied to the forward link alone.

Figure 22:
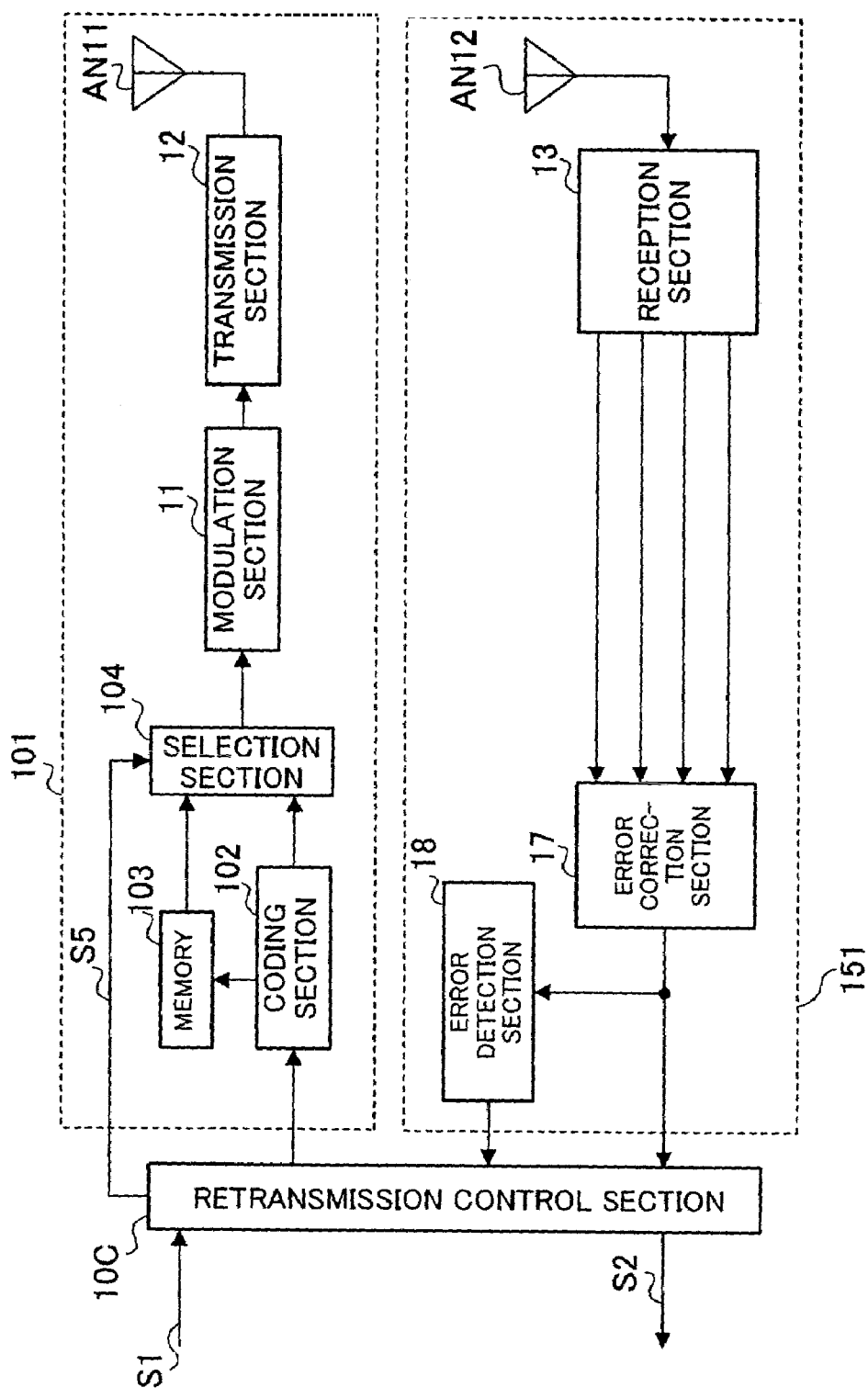
FIG. 22 is a block diagram illustrating a configuration of a transmission/reception apparatus according to Embodiment 13 of the present invention.

A specific configuration of the transmission/reception apparatus according to this embodiment is illustrated in FIG. 22. This embodiment explains a case where the retransmission method explained in Embodiment 9 is applied to only the forward link. In FIG. 22 where the same reference numerals as those of FIG. 18 explained in Embodiment 9 are added to the parts corresponding to FIG. 18, 150 as a whole shows a configuration of a radio base station apparatus according to Embodiment 13 of the present invention.

As is obvious from FIG. 22, since the radio base station apparatus 150 sends the same retransmission signal as in Embodiment 9 in the forward link, the configuration of the modulation transmission section 101 is the same as in Embodiment 9. In contrast to this, since the same retransmission signal as in the convention case is transmitted from the reverse link, the reception/demodulation section 151 has the same configuration as in the conventional case having no memories 106 to 109.

Thus, according to the aforementioned configuration, the retransmission method of the present invention explained in the above Embodiments 1 to 12 is applied to the forward link alone, thereby reducing the hardware scale of the base station without decreasing the overall system throughput in addition to the effect obtained in Embodiments 1 to 12.

Embodiment 14

The feature of this embodiment lies in that the bits punctured at the time of transmission are retransmitted over a plurality of times. This makes it possible to further improve both transmission efficiency and the error rate characteristic as compared with Embodiments 9 to 13.

As according to the standardization in progress under MMAC and BRAN (Broadband Radio Access Networks), there is a case in which puncturing at the time of transmission is performed in the following two steps. Namely, in the first step, redundancy bits, which are added when error correction coding is performed, are punctured. For example, when convolutional coding with a constraint length of 7 is performed as in MMAC and BRAN, only 12 bits are punctured (this is called 1ST puncture in MMAC and BRAN). In the second step, puncturing is performed according to the code rate. For example, when convolutional coding with a code rate of ¾ is performed, two bits out of six bits are punctured (this is called 2ND puncture in MMAC and BRAN).

Here, there is a case where, depending on the channel quality, no error occurs if only one of the punctured bits of the above two kinds is retransmitted. In such a case, when only one of the punctured bits is retransmitted and an error still occurs, the other punctured bits are retransmitted, thereby further improving both transmission efficiency and the error rate characteristic.

Moreover, as in Embodiment 12, the method for adaptively changing only either one of them is retransmitted or both are retransmitted is also effective depending on the channel quality.

Figure 23:
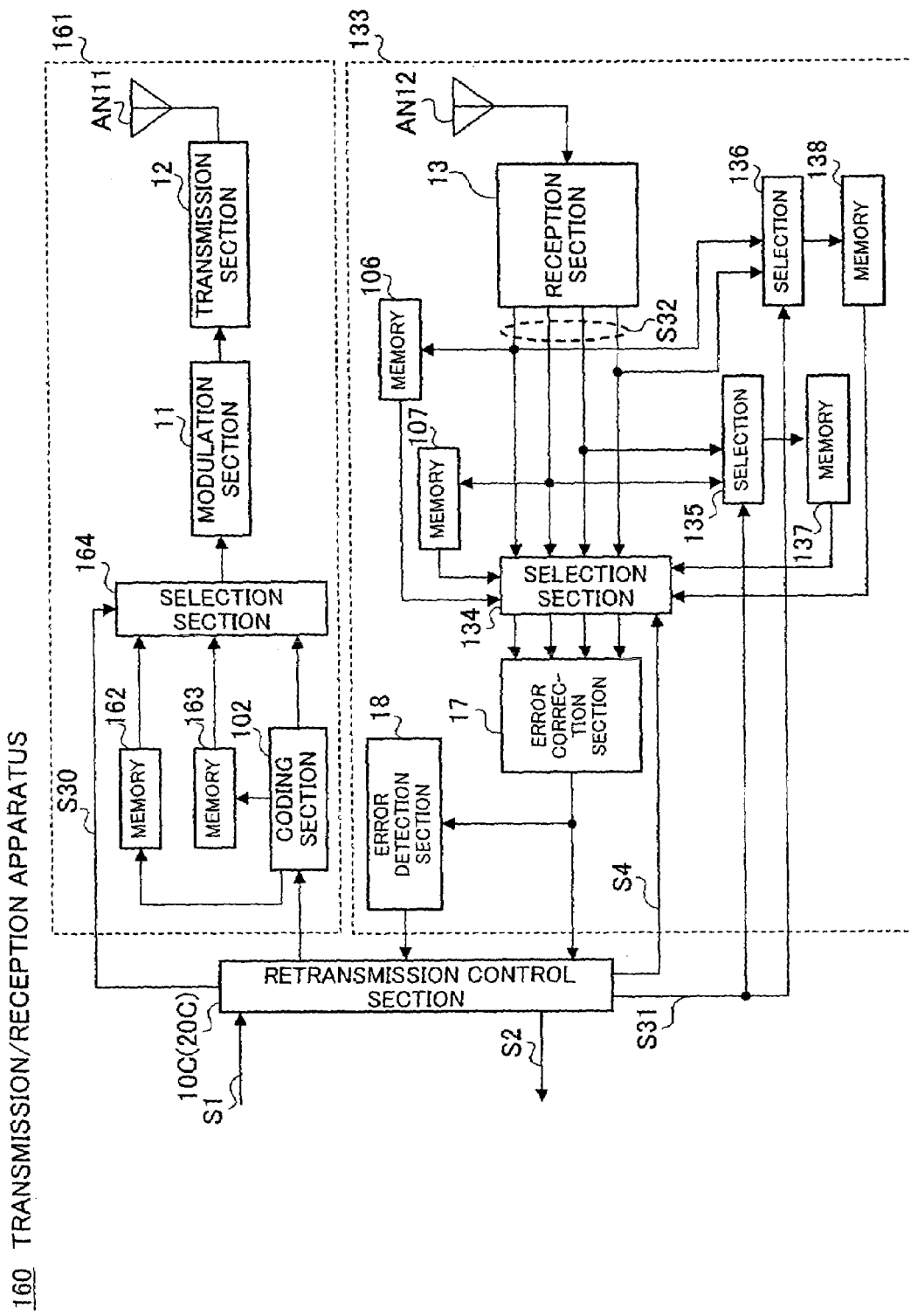
FIG. 23 is a block diagram illustrating a configuration of a transmission/reception apparatus according to Embodiment 14 of the present invention.

A specific configuration of the transmission/reception apparatus according to this embodiment is illustrated in FIG. 23. In FIG. 23 where the same reference numerals as those of FIG. 20 explained in Embodiment 11 are added to the parts corresponding to FIG. 20, 160 as a whole shows a transmission/reception apparatus according to Embodiment 14 of the present invention.

A modulation/transmission section 161 of the transmission/reception apparatus 160 includes two kinds of memories 162 and 163. Among the bits punctured at the time of transmission, the 1ST punctured bits are stored in one memory 162 and the 2ND punctured bits are stored in the other memory 163.

Then, one of the outputs from the coding section 102, and the memories 162 and 163, is selected by the selection section 164. Namely, coding data obtained by the coding section 102 and subjected to convolutional coding processing and puncturing processing are transmitted at the time of initial transmission, only the 1ST punctured bits are retransmitted at the time of first retransmission, and only the 2ND punctured bits are retransmitted at the time of second retransmission. It is needless to say that the retransmitting order may be reversed.

Thus, according to the aforementioned configuration, the bits punctured at the time of transmission are retransmitted over a plurality times, thereby further improving both transmission efficiency and the error rate characteristic as compared with Embodiments 9 to 13. In addition, this embodiment explained a case where the bits punctured at the time of transmission are retransmitted in two times. However, the present invention is not limited to this, and it is needless to say that retransmission may be performed in, for example, three times (where the 2ND punctured bits are retransmitted in two times).

Embodiment 15

The feature of this embodiment lies in that retransmitted information is to have high signal likelihood upon error correction. This makes it possible to further improve the error rate characteristic as compared with Embodiments 1 to 14.

Since retransmission burst uses a modulation scheme with a reduced modulation level (in FIG. 18 to FIG. 23, the same modulation scheme as that employed at the time of initial transmission is used at the time of retransmission in order to simplify the explanation), the channel quality improves better in comparison to the signal at the time of initial transmission. Moreover, in consideration of the error correction, an increase in signal likelihood improves the error rate characteristic.

The present inventor has focused on this point and arrived at the present invention believing that retransmission data could further improve error correction effect by increasing likelihood (that is, by increasing signal amplitude).

Figure 24:
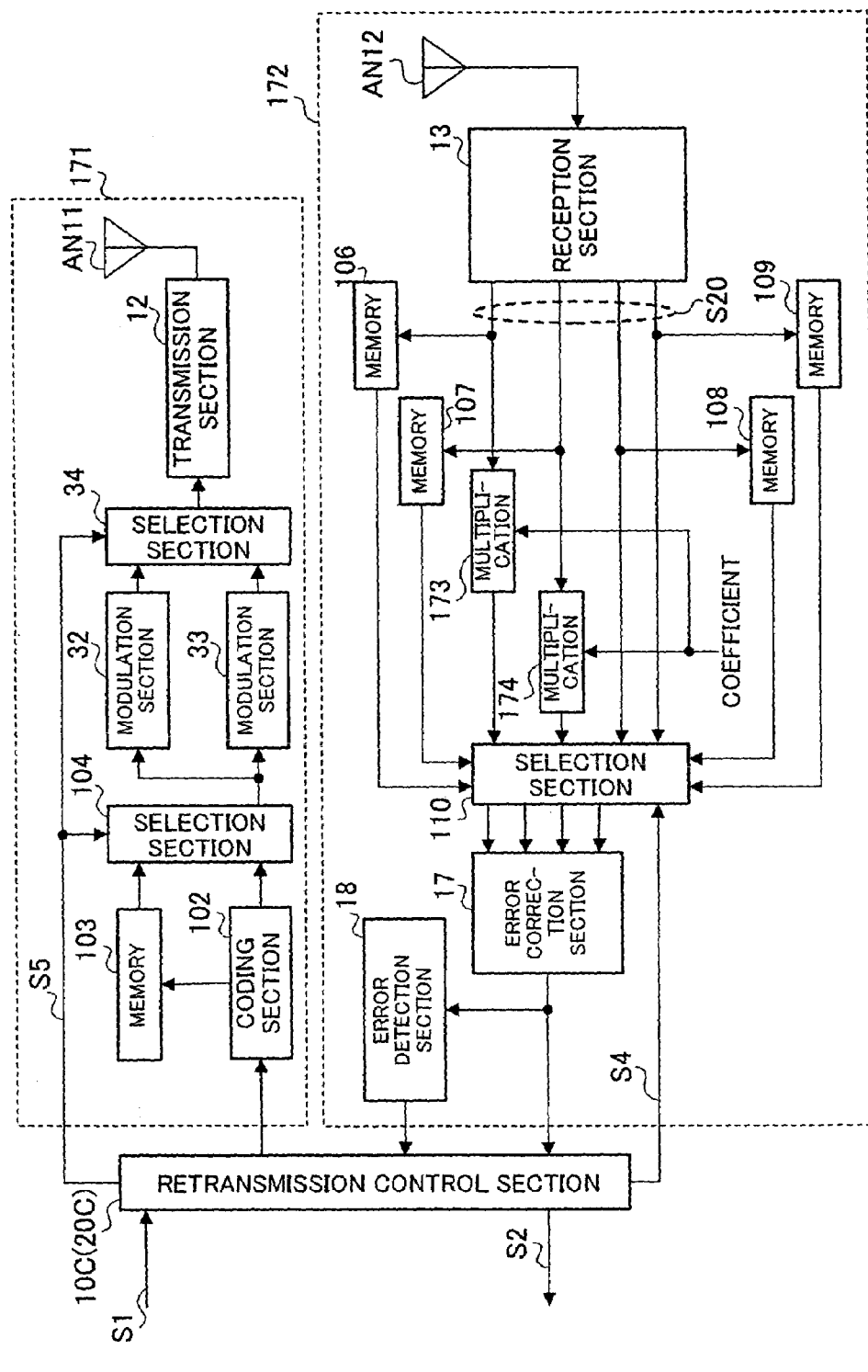
FIG. 24 is a block diagram illustrating a configuration of a transmission/reception apparatus according to Embodiment 15 of the present invention.

A specific configuration of the transmission/reception apparatus according to this embodiment is illustrated in FIG. 24. In FIG. 24 where the same reference numerals as those of FIG. 18 explained in Embodiment 9 are added to the parts corresponding to FIG. 18, 170 as a whole shows a transmission/reception apparatus according to Embodiment 15 of the present invention.

A modulation/transmission section 171 of the transmission/reception apparatus 170 includes the modulation section 33 that performs 16-level QAM modulation to a transmission signal obtained at the time of initial transmission and the modulation section 32 that performs QPSK modulation to a retransmission signal. A reception/demodulation section 172 includes multipliers 173 and 174. Multiplication coefficients of the multipliers 173 and 174 are set to "1" at the time of receiving the signal of the initial transmission, and set to a larger level than "1" at the time of receiving the retransmission signal. This makes it possible to increase likelihood of retransmission data.

Thus, according to the aforementioned configuration, the signal likelihood of the retransmitted received signal at the time of error correction is increased, thereby further improving the error rate characteristic as compared with Embodiments 1 to 14.

Embodiment 16

The feature of this embodiment lies in that the level by which the signal likelihood explained in Embodiment 15 is increased is selected to be a level that can be achieved by a bit shift circuit. More specifically, it is selected to be 2×N, (where N is a positive integer) Since this makes it possible to use bit shift circuits in place of the multipliers, the circuit scale can be reduced, with the result that the level of signal likelihood at the time of error correction can be increased by a simple circuit configuration.

Figure 25:
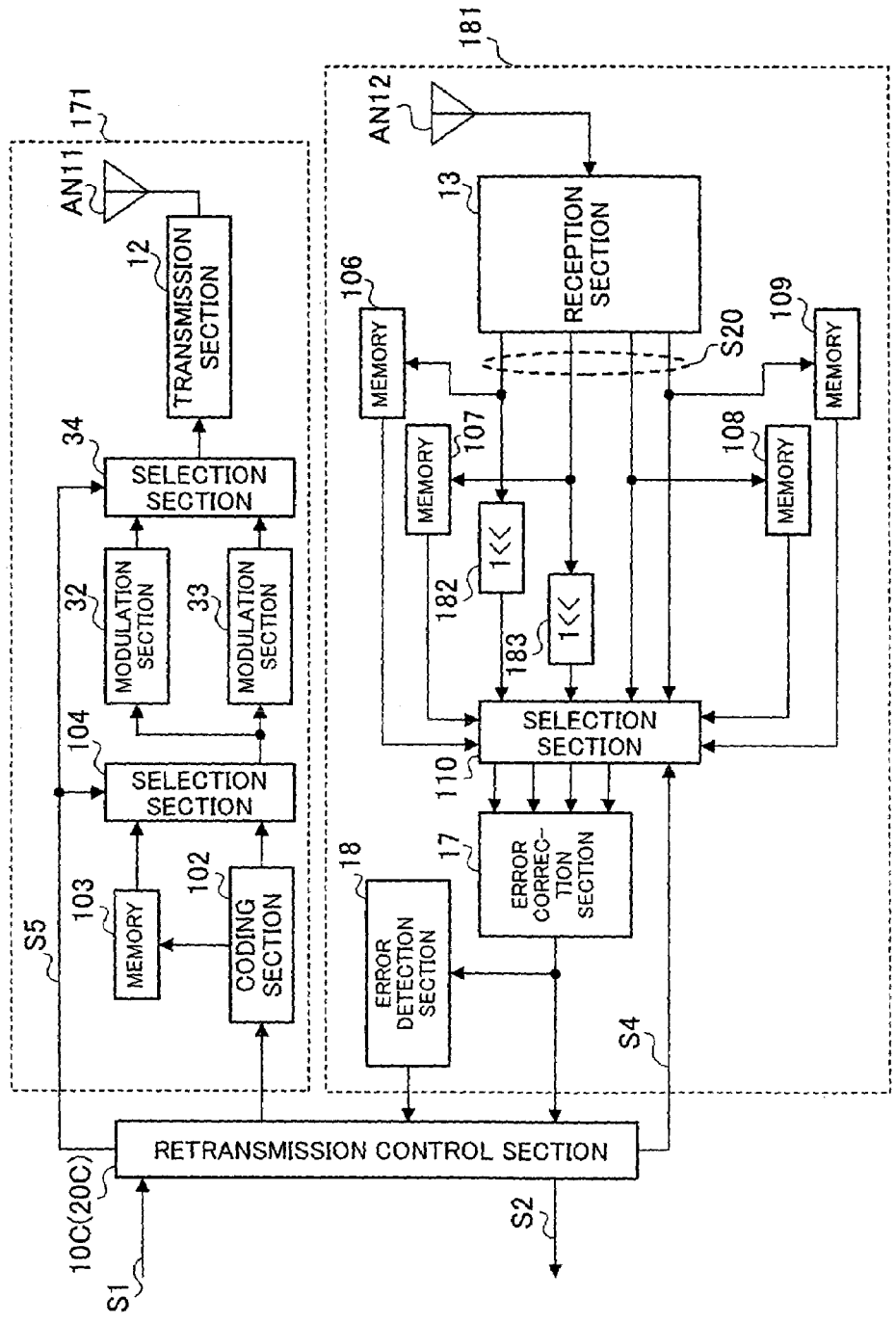
FIG. 25 is a block diagram illustrating a configuration of a transmission/reception apparatus according to Embodiment 16 of the present invention.

A specific configuration of the transmission/reception apparatus according to this embodiment is illustrated in FIG. 25. In FIG. 25 where the same reference numerals as those of FIG. 24 explained in Embodiment 15 are added to the parts corresponding to FIG. 24, 180 as a whole shows a transmission/reception apparatus according to Embodiment 16 of the present invention.

The transmission/reception apparatus 180 is formed by the same configuration as that of the transmission/reception apparatus 170 in FIG. 24 except that one-bit shift circuits 182 and 183 are provided in place of the multipliers of the reception/demodulation section 181. This enables to double the likelihood of the retransmission signal by use of the one-bit shift circuits 182 and 183.

Thus, according to the aforementioned configuration, the level by which the signal likelihood is increased is selected to be 2×N (where N is a positive integer), thereby increasing likelihood by use of the bit shift circuits, with the result that the error rate characteristic can be improved by the simple circuit configuration. In addition, this embodiment explained a case where the signal likelihood is increased by double (that is, by one-bit shift). However, the present invention is not limited to this, and it is needless to say that any level (namely, 2×N, where N is a positive integer) can be selected as long as it is a level that can be implemented without multiplication.

OTHER EMBODIMENTS

Additionally, the aforementioned embodiments 1 to 3 explained case where 16-level QAM was used. However, the present invention is not limited to this, and can be widely applied to the transmission/reception apparatus using modulation schemes that transmit signals of three bits or more in one symbol. For example, the present invention is applicable to cases of using, for example, 8 PSK, 64-level QAM, 256-level QAM. In the case where 8 PSK is used, only one least significant bit may be retransmitted. Moreover, even when the modulation scheme is adaptively changed (generally referred to as adaptive modulation), it is possible to obtain the same effect as in the aforementioned embodiments.

Moreover, the aforementioned embodiments 4 to 7 explained cases where 64-level QAM was used. However, the present invention is not limited to this, and can be widely applied to the transmission/reception apparatus using M-ary modulation that modulates data comprising six bits or more into one symbol.

Furthermore, the aforementioned embodiment 6 explained a case where the signal level of the received signal was detected as channel quality. However, the present invention is not limited to this, and, the channel quality may be measured based on, for example, SIR (Signal to Interference Ratio).

Moreover, the aforementioned embodiments explained cases where OFDM modulation scheme was used for secondary modulation. However, the present invention is not limited to this, and arbitrary transmission schemes can be used.

For example, the present invention is applicable to, for example, OFDM-CDMA schemes, DS-CDMA, single carriers, and the like.

The present invention is not limited to above embodiments 1 to 16, and various modifications are possible.

(1) The transmission/reception apparatus of the present invention may be configured to uses a modulation scheme that transmits data comprising at least three bits in one symbol and comprise: a reception section that receives a retransmission request signal from a communication partner; and a transmission section that retransmits only a bit that is susceptible to error to a radio station of the communication partner, when the reception section receives the retransmission request signal. According to this configuration, only the bits that actually need to be retransmitted are retransmitted, so that the number of bits required for retransmission can be reduced. As a result, retransmission efficiency can be improved without increasing the error rate. This makes it possible to increase communication capacity of normal data by an amount corresponding to reduction in capacity used in retransmission.

(2) The transmission/reception apparatus of the present invention as in (1) may also be configured such that the transmission section changes the number of retransmitting bits according to channel quality.

According to this configuration, since the number of retransmission bits can be adaptively changed according to propagation path environment of the signal, the number of retransmission bits can be effectively reduced without wasteful use of radio resource as much as possible.

(3) The transmission/reception apparatus of the present invention as in (1) may also be configured to further comprise: a first modulation section that modulates data comprising N bits into one symbol; a second modulation section that modulates data comprising M bits (M>N) into one symbol; and a modulation scheme selection section that selects one of the modulation sections, wherein the modulation scheme selection section selects the first modulation section when a retransmission request signal is received by the reception section, and selects the second modulation section when no retransmission request signal is received by the reception section.

According to this configuration, since the signal modulated by the first modulation section is less likely to have transmission error than the signal modulated by the second modulation section, the error rate of the retransmission signal can be reduced lower than the initial transmission. As a result, the number of retransmissions can be reduced. This makes it possible to further reduce the total number of retransmitting bits.

(4) The transmission/reception apparatus of the present invention as in (1) may also be configured such that the transmission section further comprises a 16-level QAM modulation section and modulates data comprising four bits into one symbol upon a normal transmission, and, when the retransmission request signal is received, retransmits only two bits that are more susceptible to error, without retransmitting two bits that are less susceptible to error.

According to this configuration, as compared with the case in which all bits are retransmitted as in the conventional case, the number of retransmission bits can be reduced to ½. Further, since only the bits susceptible to error are retransmitted, only bits that actually need to be retransmitted are retransmitted, so that the number of retransmitting bits can be effectively reduced without increasing the error rate.

(5) The transmission/reception apparatus of the present invention may also be configured such that the transmission section comprises an M-ary modulation section that modulates data comprising at least six bits into one symbol and transmits the symbol upon a normal transmission, and, when a retransmission request signal is received, retransmits only lower two bits that are susceptible to error.

According to this configuration, as compared with the case in which all bits are retransmitted as in the conventional case, the number of retransmission bits can be reduced to ⅓. Further, since only the bits susceptible to error are retransmitted, only the bits that actually need to be retransmitted are retransmitted, so that the number of retransmitting bits can be effectively reduced without increasing the error rate.

(6) The transmission/reception apparatus of the present invention as in (1)-(5) may also be configured to further comprises an OFDM modulation section that superimposes a transmission signal on a plurality of subcarriers orthogonal to each other, wherein, when a retransmission request is sent, a retransmission signal is superimposed on a different subcarrier than a normal transmission signal and retransmitted.

According to this configuration, since the error rate of the signal differs between different subcarriers due to influences such as frequency-selective fading and the like, the probability is reduced that an error will occur continuously at the time of retransmission even if an error occurs at the time of normal transmission. As a result, since the number of retransmissions can be reduced, and the total number of retransmitting bits can be reduced.

(7) The transmission/reception apparatus of the present invention may also be configured to comprise: a reception/demodulation section that receives a transmission signal where data comprising P bits, which is at least three bits, is modulated into one symbol and transmitted, and demodulates the received signal into the data comprising P bits; a memory section that stores higher Q bits (Q<P) of the data, comprising P bits and demodulated by the reception/demodulation section, that are less susceptible to error; a retransmission request section that transmits a retransmission request signal to a radio station of a communication partner when a signal error occurs in the signal demodulated by the reception/demodulation section; and an error correction section that performs error correction processing in response to the retransmission request signal, using data comprising lower bits excluding the higher Q bits, sent from the radio station of the communication partner, and data comprising the higher Q bits stored in the memory section.

(8) The transmission/reception apparatus of the present invention as in (7) may also be configured such that the reception/demodulation section receives a signal where data comprising at least six bits is transmitted in one symbol, and the memory section stores higher four bits of the data demodulated by the reception/demodulation section in response to a first retransmission signal, and stores higher two bits in response to a next retransmission signal for the same data.

According to this configuration, when an error occurs even if the higher four bits of the demodulated six bits are stored at the time of initial reception and the lower two bits are received at the first retransmission, the third and fourth bits, counted from the top, that are next susceptible to error to the fifth and sixth bits, are also subject to retransmission, and only the higher two bits are stored in the memory section. As a result, the error rate at the second retransmission and afterward can be considerably reduced, and an increase in the number of retransmissions can be suppressed. This makes it possible to effectively reduce the number of retransmission bits without increasing the error rate.

(9) The transmission/reception apparatus of the present invention as in (7) may also be configured such that the reception/demodulation section receives a signal where data comprising at least six bits is transmitted in one symbol, and the memory section stores four bits of the data demodulated by the reception/demodulation section that are less susceptible to error.

According to this configuration, the number of retransmission bits can be effectively reduced without increasing the error rate and data arranged in the same manner as that of the transmission time can be stored from the retransmitted bits and the stored bits.

(10) The transmission/reception apparatus of the present invention as in (7) may also be configured to further comprise a channel quality detection section that detects channel quality between the radio station of the communication partner and the transmission/reception apparatus, wherein the retransmission request section changes the number of bits to request retransmission from the radio station of the communication partner according to the detected channel quality.

According to this configuration, since the number of retransmission bits can be adaptively changed according to propagation path environment of the signal, the number of retransmission bits can be effectively reduced. Moreover, since the number of retransmission bits is reduced with consideration given to the channel quality instead of reducing the number of retransmission bits at random, the number of retransmission bits can be effectively reduced without increasing the error rate as compared with the case in which all bits are retransmitted as in the conventional case.

(11) The transmission/reception apparatus of the present invention as in (10) may also be configured such that the retransmission request section reduces the number of bits to request retransmission as the channel quality detected by the channel quality detection section improves, and the memory section increases the number of higher bits to store as the channel quality detected by the channel quality detection section improves.

According to this configuration, good channel quality means that the propagation path is not readily susceptible to error, and, since it can be considered that the error rate does not increase even if the number of retransmission bits is reduced, the number of retransmission bits is reduced. As a result, the number of retransmission bits can be effectively reduced.

(12) The transmission/reception apparatus of the present invention as in (11) may also be configured such that: the channel quality detection section detects a signal level of the received signal obtained by the reception/demodulation section as the channel quality; based on the detected signal level, the retransmission request section transmits a retransmission request signal instructing to make that the number of retransmitting lower bits smaller as the signal level increases; and, based on the detected signal level, the memory section increases the number of the higher bits to store as the signal level increases.

According to this configuration, when the received signal level is high, the distance between the symbol of demodulation target at the time of demodulation and the amplitude threshold level increases, and an error is less likely to occur, so that the error rate does not increase even if the number of retransmitting lower bits is reduced. As a result, the number of retransmission bits can be effectively reduced.

(13) The transmission/reception apparatus of the present invention as in (7) may also be configured such that: the reception/demodulation section further comprises a delay dispersion detection section that receives an OFDM signal where transmission data is superimposed on a plurality of subcarriers orthogonal to each other, and detects an amount of delay dispersion of the received signal obtained by the reception/demodulation section; based on the amount of delay dispersion detected by the delay dispersion detection section, the retransmission request section transmits a retransmission request signal instructing to make number of retransmitting lower bits smaller as the amount of delay dispersion decreases; and, based on the amount of delay dispersion detected by the delay dispersion detection section, the memory section increases the number of higher bits to store as the amount of delay dispersion decreases. According to this configuration, since it can be considered that the transmission signal is not influenced by signal delay due to multipath and the reception quality deteriorates little and the probability of transmission error is low in such case, the error rate does not increase even if the number of retransmission bits is reduced. As a result, the number of retransmission bits can be effectively reduced without increasing the error rate.

(14) The transmission/reception apparatus of the present invention as in (7) may also be configured such that the reception/demodulation section further comprises: a signal level detection section that detects a signal level of the received signal obtained by the reception/demodulation section in addition to receiving an OFDM signal where transmission data is superimposed on a plurality of subcarriers orthogonal to each other; a delay dispersion detection section that detects an amount of delay dispersion of the received signal obtained by the reception/demodulation section; a threshold level selection section that selects a higher threshold level as the amount of delay dispersion detected by the delay dispersion detection section increases, as a threshold for the signal level of the received signal; and a comparison section that compares the signal level of the received signal with the threshold level selected by the threshold level selection section; and, when a comparison result indicating that the signal level is higher than the threshold level is obtained by the comparison section, the retransmission request section transmits a retransmission request signal instructing to make the number of retransmitting lower bits smaller, and the memory section increases the number of higher bits to store.

According to this configuration, attention is paid to the fact that as the delay dispersion decreases, or as the received signal level decreases, the probability of transmission error decreases, and the selection of the threshold level of the received signal level and the comparison between the received signal level and the threshold level are performed, so as to determine the number of retransmission bits according to the comparison result. In other words, the number of transmitting bits reflects both the amount of delay dispersion and the received signal level. As a result, the number of retransmission bits can be reduced more effectively without increasing the error rate.

(15) The transmission/reception apparatus of the present invention as in (13) or (14) may also be configured such that the delay dispersion detection section uses a level normalized by the signal level of the received signal as the amount of delay dispersion.

According to this configuration, it is possible to suppress an error in the amount of delay dispersion due to an error of a received signal amplifying circuit. As a result, since the likelihood of occurrence of transmission error can be accurately estimated, the number of retransmission bits can be selected and the number of retransmission bits can be accurately reduced without increasing the error rate according to the actual propagation path environment.

(16) The transmission/reception apparatus of the present invention may also be configured to further comprise: a reception section that receives a retransmission request signal from a communication partner; and, a transmission section that retransmits only punctured bits to the radio station of the communication partner as a retransmission signal, when the reception section receives the retransmission request signal.

According to this configuration, only the bits that are effective to improve the error rate are actually transmitted upon retransmission, so that the retransmission efficiency can be improved.

(17) The transmission/reception apparatus of the present invention as in (16) may also be configured to further comprise a modulation section that modulates data comprising at least three bits into one symbol, wherein the transmission section transmits a bit that is susceptible to error in addition to the punctured bits, as the retransmission signal.

According to this configuration, it is possible to further improve the error rate characteristic by the amount corresponding to the retransmission of the bits susceptible to error without reducing the retransmission efficiency so much as compared with (16).

(18) The transmission/reception apparatus of the present invention as in (17) may also be configured such that the transmission section transmits only one of the punctured bits and the bit susceptible to error per retransmission.

According to this configuration, instead of transmitting both the punctured bits and the bits susceptible to error per retransmission, one of the punctured bits and the bits susceptible to error are transmitted per retransmission, and when an error is detected even at the first retransmission, the bits of the other are transmitted at a next retransmission, thereby reducing the amount of retransmitting information at one retransmission. Accordingly, both transmission efficiency and the error rate characteristic can be further improved.

(19) The transmission/reception apparatus of the present invention as in (17) may also be configured to further comprise a channel quality detection section that detects channel quality between the radio station of the communication partner and the transmission/reception apparatus, wherein, the transmission section transmits only one of the punctured bits and the bit susceptible to error per retransmission when the channel quality is good, and transmits both the punctured bits and the bit susceptible to error per retransmission when the channel quality is poor.

According to this configuration, when the channel quality is good, since the probability is high that retransmission will be completed at one time, one of the punctured bits and the bits susceptible to error are transmitted per retransmission to reduce the amount of information retransmitted per retransmission. While, since excellent error correction capacity is desirable to complete the retransmission at one time as the channel quality becomes poor, both the punctured bits and the bits susceptible to error are transmitted upon one retransmission. As a result, the amount of retransmitting information and the number of retransmissions can be reduced effectively to improve transmission efficiency.

(20) The transmission/reception apparatus of the present invention as in (16) may also be configured such that the punctured bits are transmitted over a plurality of times.

According to this configuration, since there is a case in which no error occurs where not all of the punctured bits are transmitted upon one retransmission, retransmission of the punctured bits is divided into a plurality of times, so to increase the number of retransmission bits every time an error occurs, thereby further improving both transmission efficiency and the error rate characteristic.

(21) The transmission/reception apparatus of the present invention may also be configured to comprise: a reception/modulation section that receives a transmission signal where data comprising at least three bits is subjected to convolutional coding processing and puncturing processing, modulated into one symbol, and transmitted, and that demodulates the received signal; a memory section that stores data demodulated by the reception/demodulation section; a retransmission request section that transmits a retransmission request signal to a radio station of a communication partner when an error occurs in the signal demodulated by the reception/demodulation section; and an error correction section that performs error correction processing in response to the retransmission request signal using punctured data sent from the radio station of the communication partner and data stored in the memory section.

(22) The transmission/reception apparatus of the present invention as in one of (7)-(15) and (21) may also be configured to further comprise a section that increases likelihood of the retransmitted signal upon the error correction.

According to this configuration, the signal likelihood of the retransmitted received signal upon error correction is increased, thereby further improving the error rate characteristic as compared with (7)-(15) and (21).

(23) The transmission/reception apparatus of the present invention as in (22) may also be configured such that a level by which the likelihood is increased is selected to be 2×N, where N is a positive integer. According to this configuration, since the bit shift circuit can be used to improve the signal likelihood, it is possible to reduce the circuit scale, with the result that the level of the signal likelihood upon error correction can be improved by the simple circuit structure.

(24) A radio base station apparatus of the present invention may be configured to comprise the transmission/reception apparatus of one of (1)-(23).

(25) A communication terminal apparatus of the present invention may be configured to comprise the transmission/reception apparatus of one of (1)-(23).

(26) A transmission/reception method of the present invention may be configured to use a modulation scheme that transmits data comprising at least three bits in one symbol and configured such that only punctured bits are retransmitted to a radio station of a communication partner when a retransmission request signal is received from the radio station of the communication partner.

(27) The transmission/reception method of the present invention may also be configured to comprise the steps of: receiving a transmission signal where data comprising P bits, which is at least three bits, is modulated into one symbol and transmitted; demodulating the received signal into the data comprising P bits; storing higher Q bits of the demodulated data comprising P bits that are less susceptible to error; transmitting a retransmission request signal to a radio station of a communication partner when a signal error occurs in the demodulated signal; and performing error correction processing in response to the retransmission request signal using data comprising lower bits excluding the higher Q bits, sent from the radio station of the communication partner, and data comprising the stored higher bits.

(28) The transmission/reception method of the present invention may also be configured such that only punctured bits are retransmitted to a radio station of a communication partner when a retransmission request signal is received from the radio station of the communication partner.

(29) The transmission/reception method of the present invention may also be configured such that the transmission/reception method of (28) is used only on a forward link.

As explained above, according to the present invention, where a signal of three bits or more is transmitted in one symbol, when a retransmission request signal is received from a radio station of a communication partner, bits that are not readily susceptible to error are not retransmitted, while only those bits that are susceptible to error are retransmitted, thereby realizing a transmission/reception apparatus and a transmission/reception method that minimize decrease in transmission efficiency due to retransmission of data, without increasing the error rate.

This application is based on Japanese Patent Application No. 2001-265080 filed on Aug. 31, 2001 and Japanese Patent Application No. 2002-113607 filed on Apr. 16, 2002, entire content of which is expressly incorporated by reference herein.

INDUSTRIAL APPLICABILITY

The present invention is applicable to transmission/reception apparatus and transmission/reception methods that are configured to retransmit data that cannot be demodulated due to a propagation path error by ARQ schemes.

The invention claimed is:

1. A transmission/reception apparatus comprising:
a transmission section that transmits data to a communication partner by using a modulation scheme, the data comprising P bits (P≧3) and the modulation scheme assigning the P bits to one symbol; and
a reception section that receives a re-transmission request signal from the communication partner, the re-transmission request signal showing a request for re-transmitting the data from the transmission/reception apparatus to the communication partner, wherein
said transmission section re-transmits, in response to receiving the re-transmission request signal for requesting the re-transmitting of the data, only susceptible bits among the P bits of the data to the communication partner, the susceptible bits comprising R bits (R<P) and being susceptible to error due to assigning P bits of the data to the one symbol in the modulation scheme.

2. The transmission/reception apparatus according to claim 1, wherein said transmission section changes the number of re-transmitting R bits according to channel quality.

3. The transmission/reception apparatus according to claim 1, further comprising:
a first modulation section that modulates data comprising P1 bits into one symbol;
a second modulation section that modulates data comprising P2 bits (P2>P1) into one symbol; and
a modulation scheme selection section that selects one of the modulation sections, wherein
said modulation scheme selection section selects said first modulation section when the re-transmission request signal is received by said reception section, and selects said second modulation section when no re-transmission request signal is received by said reception section.

4. The transmission/reception apparatus according to claim 1, wherein said transmission section comprises a 16-level QAM modulation section that, when the re-transmission request signal is received, re-transmits only two bits that are more susceptible to error anion four bits assigned to one symbol previously transmitted.

5. The transmission/reception apparatus according to claim 1, wherein said transmission section comprises an M-ary modulation section that when the re-transmission request signal is received, re-transmits only lower two bits that are more susceptible to error among at least six bits assigned to one symbol previously transmitted.

6. The transmission/reception apparatus according to claim 1, further comprising
an OFDM modulation section that superimposes a transmission signal on a plurality of subcarriers orthogonal to each other, wherein,
when a re-transmission request is received, the OFDM modulation section superimposes the re-transmission signal on a different subcarrier from a subcarrier on which a transmission signal is superimposed when the re-transmission request is not received.

7. A transmission/reception apparatus comprising:
a reception/demodulation section that receives a transmission signal where data comprising P bits, which is at least three bits, is modulated into one symbol and transmitted, and demodulates the received signal into the data comprising P bits per one symbol;
a memory section that stores higher Q bits (Q<P) of the demodulated data comprising P bits forming one symbol, that are less susceptible to error;
a re-transmission request section that transmits a re-transmission request signal to a communication partner when a signal error occurs in the signal demodulated by said reception/demodulation section; and
an error correction section that performs error correction processing using data comprising lower bits excluding the higher Q bits in one symbol, sent from the communication partner in response to receiving the re-transmission request signal at the communication partner, and data comprising the higher Q bits in one symbol, stored in said memory section.

8. The transmission/reception apparatus according to claim 7, wherein
said reception/demodulation section receives a signal where data comprising at least six bits is transmitted in one symbol; and wherein
said memory section stores higher four bits among the data demodulated by said reception/demodulation section when said re-transmission request section transmits a first re-transmission signal, and stores higher two bits among the data demodulated by said reception/demodulation section when said re-transmission request section transmits a next re-transmission signal for the same data.

9. The transmission/reception apparatus according to claim 7, wherein
said reception/demodulation section receives a signal where data comprising at least six bits is transmitted in one symbol; and wherein
said memory section stores four bits of the data demodulated by said reception/demodulation section that are less susceptible to error.

10. The transmission/reception apparatus according to claim 7, further comprising
a channel quality detection section that detects channel quality between the communication partner and the transmission/reception apparatus, wherein
said re-transmission request section changes the number of bits to request re-transmission from the communication partner according to the detected channel quality.

11. The transmission/reception apparatus according to claim 10, wherein
said re-transmission request section reduces the number of bits to request re-transmission as the channel quality detected by said channel quality detection section improves; and wherein:
said memory section increases the number of higher bits to be stored as the channel quality detected by said channel quality detection section improves.

12. The transmission/reception apparatus according to claim 11, wherein
said channel quality detection section detects a signal level of the received signal obtained by said reception/demodulation section as the channel quality; wherein,
based on the detected signal level, said re-transmission request section transmits a re-transmission request signal instructing to make that the number of lower bits to be re-transmitted smaller as the signal level increases; and wherein,
based on the detected signal level, said memory section increases the number of the higher bits to be stored as the signal level increases.

13. The transmission/reception apparatus according to claim 7, wherein
said reception/demodulation section further comprises a delay dispersion detection section that receives an OFDM signal where transmission data is superimposed on a plurality of subcarriers orthogonal to each other, and detects an amount of delay dispersion of the received signal obtained by said reception/demodulation section; wherein,
based on the amount of delay dispersion detected by said delay dispersion detection section, said re-transmission request section transmits a re-transmission request signal instructing to make the number of lower bits to be re-transmitted smaller as the amount of delay dispersion decreases; and wherein,
based on the amount of delay dispersion detected by said delay dispersion detection section, said memory section increases the number of higher bits to be stored as the amount of delay dispersion decreases.

14. The transmission/reception apparatus according to claim 7, wherein
said reception/demodulation section further comprises:
a signal level detection section that detects a signal level of the received signal obtained by said reception/demodulation section in addition to receiving an OFDM signal where transmission data is superimposed on a plurality of subcarriers orthogonal to each other;
a delay dispersion detection section that detects an amount of delay dispersion of the received signal obtained by said reception/demodulation section;
a threshold level selection section that selects a higher threshold level as the amount of delay dispersion detected by said delay dispersion detection section increases, as a threshold for the signal level of the received signal; and
a comparison section that compares the signal level of the received signal with the threshold level selected by said threshold level selection section; and wherein,
when a comparison result indicating that the signal level is higher than the threshold level is obtained by said comparison section, said re-transmission request section transmits a re-transmission request signal instructing to make the number of lower bits to be re-transmitted smaller, and said memory section increases the number of higher bits to store.

15. The transmission/reception apparatus according to claim 13, wherein said delay dispersion detection section uses a level normalized by the signal level of the received signal as the amount of delay dispersion.

16. A transmission/reception method comprising the steps of:
receiving a transmission signal where data comprising P bits, which is at least three bits, is modulated into one symbol and transmitted;
demodulating the received signal into the data comprising P bits per one symbol;
storing higher Q bits of the demodulated data comprising P bits per one symbol, that are less susceptible to error;
transmitting a re-transmission request signal to a communication partner when a signal error occurs in the demodulated signal; and
performing error correction processing using data comprising lower bits excluding the higher Q bits in one symbol, sent from the communication partner in response to receiving the re-transmission request signal at the communication partner, and data comprising the stored higher Q bits in one symbol.

17. A transmission/reception method comprising the steps of:
transmitting data to a communication partner by using a modulation scheme, the data comprising P bits ($P \geq 3$) and the modulation scheme assigning the P bits to one symbol; and
receiving a re-transmission request signal from the communication partner, the re-transmission request signal showing a request for re-transmitting the data from the transmission/reception apparatus to the communication partner; wherein
in said step of transmitting, in response to receiving the re-transmission request signal for requesting the re-transmitting of the data, only susceptible bits among the P bits of the data are re-transmitted to the communication partner, the susceptible bits comprising R bits ($R<P$) and being susceptible to error due to assigning P bits of the data to the one symbol in the modulation scheme.

* * * * *